(12) United States Patent
Iwata et al.

(10) Patent No.: US 8,163,393 B2
(45) Date of Patent: Apr. 24, 2012

(54) ANTI-DAZZLING OPTICAL LAMINATE

(75) Inventors: Yukimitsu Iwata, Okayama (JP); Gen Furui, Okayama (JP); Yoshihiro Nishimura, Okayama (JP); Takashi Kodama, Okayama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 12/049,439

(22) Filed: Mar. 17, 2008

(65) Prior Publication Data

US 2008/0260997 A1    Oct. 23, 2008

(30) Foreign Application Priority Data

Mar. 19, 2007    (JP) .................................. 2007-070831

(51) Int. Cl.
*B32B 17/06* (2006.01)
(52) U.S. Cl. ......... 428/432; 428/689; 428/701; 428/702
(58) Field of Classification Search .................. 428/432, 428/689, 701, 702
See application file for complete search history.

(56) References Cited

U.S. PATENT DOCUMENTS

| | | | |
|---|---|---|---|
| 2004/0240070 A1* | 12/2004 | Suzuki et al. | 359/599 |
| 2005/0255291 A1* | 11/2005 | Iwata et al. | 428/141 |
| 2008/0137206 A1* | 6/2008 | Nakamura et al. | 359/601 |

FOREIGN PATENT DOCUMENTS

| | | |
|---|---|---|
| JP | 11-295729 | 10/1999 |
| JP | 3703133 | 7/2005 |
| JP | 2007-045142 A1 | 2/2007 |
| WO | WO 2006/088204 A1 | 8/2006 |

* cited by examiner

*Primary Examiner* — Gwendolyn Blackwell
(74) *Attorney, Agent, or Firm* — Burr & Brown

(57) ABSTRACT

An anti-dazzling laminate which is an optical laminate comprising a light transparent base material and an anti-dazzling layer provided on the light transparent base material. The outermost surface of the anti-dazzling layer has a concavoconvex shape, and the optical laminate satisfies the following requirements: Ha is more than 0% and less than 8%, Hi is more than 0% and not more than 6%, and Hi/Ha is not less than 0.013 and less than 0.8, wherein Ha represents the whole haze value of the optical laminate; and Hi represents the internal haze value of the optical laminate.

20 Claims, 1 Drawing Sheet

ANTI-DAZZLING OPTICAL LAMINATE

CROSS-REFERENCE TO RELATED APPLICATION

This application is based upon and claims the benefit of priority from the prior Japanese Patent Application No. 70831/2007 under the Paris Convention, and, thus, the entire contents of the basic application are incorporated herein by reference.

FIELD OF THE INVENTION

The present invention provides an anti-dazzling optical laminate for use in displays such as CRTs, PDPs, and liquid crystal panels.

BACKGROUND OF THE INVENTION

The prevention of lowered contrast and lowered visibility caused by external light reflection or image reflection is required of image display devices, for example, cathode-ray tube display devices (CRTs), plasma displays (PDPs), organic or inorganic electroluminescent displays (ELDs), field emission displays (FEDs), or liquid crystal displays (LCDs). Accordingly, it is common practice to provide an antireflection laminate on the outermost surface of an image display device from the viewpoint of reducing image reflection or reflectance using the principle of light scattering or the principle of optical interference.

In image display devices, for example, liquid crystal displays, the use of an anti-dazzling laminate as one of antireflection laminates has hitherto been known for regulating optical properties to realize excellent image displays. The anti-dazzling laminate is utilized for preventing a lowering in visibility as a result of external light reflection or image reflection within image display devices. The anti-dazzling laminate is generally realized by forming an anti-dazzling layer having a concavoconvex shape on a base material. In image display devices, for example, liquid crystal displays, the use of an anti-dazzling laminate as one of antireflection laminates has hitherto been known from the viewpoint of regulating optical properties to realize excellent image display. The anti-dazzling laminate is utilized for preventing a lowering in visibility as a result of external light reflection or image reflection within image display devices.

In recent years, a demand for a higher level of definition of panel resolution has led to a higher level of fineness of the concavoconvex shape of the anti-dazzling layer. Accordingly, a concavoconvex shape having a broad and large curve has been regarded as unsuitable for meeting a demand for higher definition in the anti-dazzling laminate having the above construction and thus have not been adopted. On the other hand, when increasing the fineness of the concavoconvex shape involved in higher definition of panel resolution can meet a demand for higher definition of the panel resolution. Regarding this technique, however, it has often been pointed out that external light is reflected from the display surface resulting in such a phenomenon that, for example, the image display surface is seen white (whitening), or lowered contrast. When the anti-dazzling laminate having the concavoconvex shape is used on the image display surface of notebook computers and the like, a certain level of satisfactory optical properties can be provided. When the light transmitted through the backside of backlight within a display is transmitted through the concavoconvex shape face of the anti-dazzling laminate formed on the outermost surface of the panel, however, the concavoconvex shape functions as fine lenses which disturb the displayed pixels and the like, that is, "glare" is likely to occur. This unfavorable phenomenon makes it difficult to satisfactorily attain the effect of the anti-dazzling laminate per se.

In order to eliminate this "glare" involved in an enhancement in panel resolution, for example, a method has been adopted in which surface concavoconvexes are densely provided to enhance the sharpness and, at the same time, scattering particles different from the resin for anti-dazzling layer formation in refractive index are added to, for example, impart internal scattering effect to the anti-dazzling laminate. All of proposed methods could satisfactorily solve the problem of the "glare," but on the other hand, they sometimes lowered the visibility of the whole image. On the other hand, in the anti-dazzling laminate, the method for preventing the "glare" in high-definition panels has been regarded as a main cause of an unfavorable phenomenon, for example, a deterioration in contrast such as clouding (opacification) caused by surface whitening or internal scattering effect. That is, it has been regarded that "glare prevention" and "contrast improvement" are in the relationship of tradeoff, and simultaneously meeting both the requirements is difficult. In the above methods, for example, black color reproduction in on-screen display has sometimes been poor. That is, gradation rendering of black color in a light room, particularly a black color gradation difference in low gradation, cannot be regarded without difficulties resulting in lowered sensitivity. Specifically, black and gray colors are only recognized as a blurred and identical color-tone black color. In particular, an anti-dazzling laminate having better anti-glare properties has a significantly lowered level of visibility.

On the other hand, a light diffusion layer having light diffusion properties improved by bringing the ratio between the internal haze and the whole haze to 2 to 1000 and bringing the internal haze to not less than 5% has been proposed (Japanese Patent Laid-Open No. 295729/1999). Further, an anti-dazzling laminate has been proposed in which glare preventive effect and white blurring preventive effect can be effectively attained by bringing the whole haze value to not less than 35% and not more than 50%, bringing the internal haze value to not less than 20% and not more than 40%, and bringing the internal haze value/whole haze value to not less than 0.5 and not more than 0.8 (U.S. Pat. No. 3,703,133). According to studies by the present inventors, however, any anti-dazzling laminate, which can realize contrast high enough to realize satisfactory reproduction of black of images (black color reproduction) in a light room and can prevent glare feeling, has not been developed yet.

Accordingly, at the present time, the development of an optical laminate, which can realize good anti-dazzling properties and black color reproduction and, at the same time, can effectively prevent the glare of an image surface, has been desired. In particular, an optical laminate, which can be used in liquid crystal displays (LCDs) as well as in other applications such as cathode-ray tube display devices (CRTs), plasma displays (PDPs), fluorescent display tubes, and field emission displays, has been eagerly desired.

SUMMARY OF THE INVENTION

At the time of the present invention, the present inventors have found that it is possible to provide an optical laminate which, while imparting anti-dazzling properties, can realize improved contrast, especially improved black color reproduction, and can prevent glare. The present invention has been made based on such finding.

Accordingly, the present invention provides an optical laminate which can realize an anti-dazzling function, black color reproduction and an excellent anti-glare property, and, at the same time, can realize image display having a high level of visibility.

According to the present invention, there is provided an optical laminate comprising a light transparent base material and an anti-dazzling layer provided on the light transparent base material, wherein the outermost surface of the anti-dazzling layer has a concavoconvex shape, Ha is more than 0% and less than 8%, Hi is more than 0% and not more than 6%, and Hi/Ha is not less than 0.013 and less than 0.8, wherein Ha represents the whole haze value of the optical laminate; and Hi represents the internal haze value of the optical laminate.

The optical laminate according to the present invention can realize excellent anti-dazzling properties, black color reproduction, and anti-glare property, and can be used in various displays. In particular, the optical laminate according to the present invention can provide an optical laminate which is significantly improved in black color gradation rendering (glossy black color reproduction) in a light room, which could not have been realized by the conventional anti-dazzling laminate without difficulties. More specifically, it is possible to provide an optical laminate which, in an image in movie display, can render gradation substantially comparable with a conventional display provided with only a laminate comprising a flat clear hard coat layer free from any concavoconvex shape, or comprising a clear hard coat layer and an antireflection layer and, at the same time, can realize an image having a good sharpness of the contour of letters (character blurring prevented) and can prevent glare. In particular, the optical laminate according to the present invention is advantageous in that images which are significantly improved in black color gradation rendering (glossy black color reproduction) in a light room can be provided. In order to prevent glare, a method is adopted in which haze is imparted to the inside of the anti-dazzling layer to equalize light passed through the anti-dazzling film by diffusing effect. When diffusion reflection takes place in the surface shape of the anti-dazzling layer, maintaining good black color reproduction while avoiding pacification of the film per se can be realized by reducing the internal haze. In the prior art, in order to effectively prevent glare, the internal haze has been increased. This, however, has made it difficult to maintain the black color reproduction. Accordingly, when such prevention measures are taken, the black color reproduction can be maintained by providing concavoconvexes which are less likely to cause diffusion reflection and reducing the internal haze by a minimum necessary level (the upper limit haze: about 7) to prevent glare.

In a preferred embodiment of the present invention, the anti-dazzling layer may be formed in a single layer structure. Alternatively, the anti-dazzling layer may be formed by forming a surface modifying layer on a substrate concavoconvex layer having a concavoconvex shape. Further, another optical function layer may be stacked on the anti-dazzling layer having a single layer structure or the surface modifying layer. In the anti-dazzling optical laminate having the above construction, a fine concavoconvex shape may be sealed in such a state that a concavoconvex shape mainly having a gentle waviness is present whereby the anti-dazzling optical laminate can exhibit desired anti-dazzling properties. As a result, when the surface modifying layer is formed, the anti-dazzling optical laminate can impart various functions such as antistatic properties, hardness regulation, refractive index regulation, and contamination prevention to the optical laminate.

The terms used in the present invention have the following respective meanings.

The term "black color reproduction" means that an image screen, which has excellent contrast and is free from character blurring by virtue of its prevention, can be reproduced. Here the expression "excellent contrast" means that, by virtue of excellent black (color) reproduction, the gradation of black color is good and the black-and-white contrast is good. Further, the expression "character blurring prevented" means that characters reproduced on the screen surface are reproduced as having excellent sharpness of the contour by virtue of satisfactory black-and-white contrast.

DETAILED DESCRIPTION OF THE INVENTION

I. Definition

Resin

Figure 1:
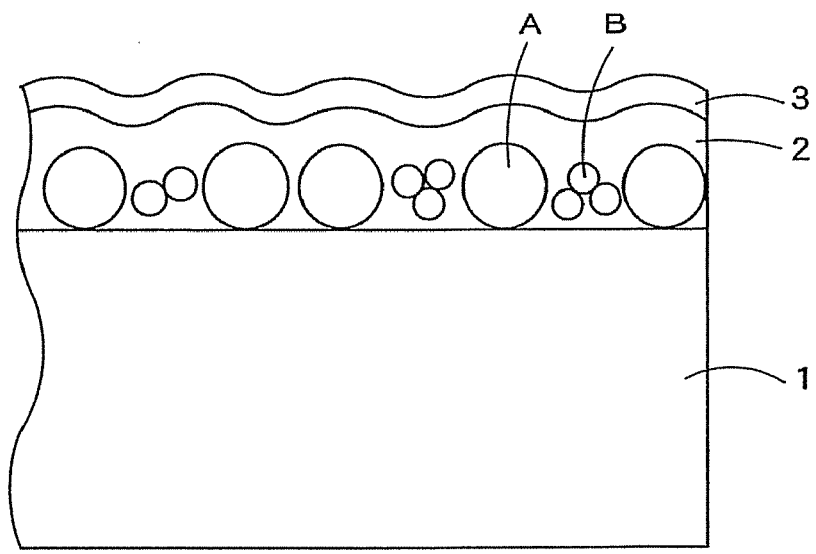
FIG. 1 is a schematic cross-sectional view of an optical laminate according to the present invention.

Curable resin precursors such as monomers, oligomers, and prepolymers are collectively defined as "resin," unless otherwise specified.

Surface Haze (Hs), Internal Haze (Hi), and Whole Haze (Ha)

The term "surface haze (H)" as used herein is determined as follows. A proper mixture of an acrylic monomer such as pentaerythritol triacrylate with other oligomer or polymer is diluted with methyl ethyl ketone, toluene, or a mixed solvent composed of the above solvents or the like to a solid content of 60%, and the diluted solution is coated with a wire bar onto concavoconvexes of the anti-dazzling layer to a thickness on a dry film basis of 8 μm, whereby the surface concavoconvexes of the anti-dazzling layer are rendered flat. In this case, when the recoating agent is likely to be repelled and difficult to wet the anti-dazzling layer due to the presence of a leveling agent added to the composition for anti-dazzling layer formation, a method may be adopted in which the anti-dazzling film is previously rendered hydrophilic by saponification. The saponification is carried out by immersing the anti-dazzling layer in a 2 mol/liter NaOH (or KOH) solution (55° C.) for 3 min, washing the film with water, completely removing water droplets with a Kimwipe and the like, and then drying the film in an oven (60° C.) for one min. The optical laminate having a flattened surface in the anti-dazzling layer does not have any haze derived from surface concavoconvexes but has only an internal haze. This haze can be determined as an internal haze (Hi). The value obtained by subtracting the internal haze (Hi) from the original optical laminate haze (whole haze (Ha)) is determined as a surface haze (Hs) attributable only to surface concavoconvexes.

Haze Value

The haze value may be measured according to JIS K 7136. A reflection-transmittance meter HM-150 (Murakami Color Research Laboratory) may be mentioned as an instrument used for the measurement. The haze is measured in such a state that the coated face is directed to a light source.

Average Spacing of Profile Irregularities (Concavoconvexes) Sm (μm), Average Inclination Angle θa (Degree), Rz (μm), and Ra (μm)

The anti-dazzling layer constituting the optical laminate according to the present invention has a concavoconvex shape. Sm (μm) represents the average spacing of profile irregularities (concavoconvexes) of the anti-dazzling layer, θa (degree) represents the average inclination angle of the concavoconvex part, Rz (μm) represents the ten-point average roughness, and Ra (μm) represents the arithmetical average roughness. These may be defined as described in an instruction manual (revised on Jul. 20, 1995) of a surface roughness measuring device (model: SE-3400, manufactured by Kosaka Laboratory Ltd.) in conformity with JIS B 0601 1994. θa (degree) represents the angle mode, and, when the inclination is Δ in terms of aspect ratio, Δ=tan θa is established (sum of differences (corresponding to the height of each convex) between the minimum part and the maximum part in each concavoconvex/reference length). The "reference length" is the same as in the following measuring condition 1 and is the measured length (cut-off value λc) which has been actually measured with a tracer by SE-3400.

In the measurement of the parameters (Sm, θa, Rz, and Ra) representing the surface roughness of the optical laminate according to the present invention, for example, the above surface roughness measuring device is provided. According to JIS B 0601 1994, the reference length and the evaluation length are selected, and the measurement is carried out under measuring conditions for the surface roughness measuring device. In the present invention, the measurement is carried out under the following conditions.

1) Tracer in surface roughness detector:
  Model/(standard 2 μm), manufactured by Kosaka Laboratory Ltd. (radius of curvature in tip 2 μm/apex angle: 90 degrees/material: diamond)
2) Measuring conditions for surface roughness measuring device:
  Reference length (cut-off value of roughness curve λc): 0.8 mm
  Evaluation length (reference length (cut-off value λc)×5): 4.0 mm
  Feed speed of tracer: 0.1 mm/sec
  Black Color Reproduction in Light Room The black color reproduction is evaluated by visually observing an assembly comprising an optical laminate provided on a panel which displays a black color under a light room environment. Specifically, the black color reproduction is evaluated by applying a sample film (Examples, Comparative Examples and the like) directly onto a display screen and visually observing the sample film from a position distant by 1 m from the sample film under a light room environment of 250 Lx. When the reflection angle of light incident on the optical laminate is wide, light is reflected in all directions (diffusion reflected) depending upon the angle of concavoconvexes on the surface of the optical laminate and then reaches the viewer's eye, making it impossible to reproduce the original black color. On the other hand, when the incident light is intensively reflected to a part around regular reflection angle, light from a light source is not substantially diffusion reflected and is brought to regularly reflected light. Since light other than the regularly reflected light does not reach the viewer's eye, the original wet black color can be reproduced. Thus, visual evaluation can be carried out.

Total Thickness of Anti-Dazzling Layer

The total thickness of the anti-dazzling layer refers to a part extended from the base material on its display surface side interface to the outermost surface of the anti-dazzling concavoconvex in contact with the air. In the part extended from the base material interface to the outermost surface, the anti-dazzling layer has either a single layer or a multilayer structure comprising a surface modifying layer and other optical function layers stacked onto the substrate concavoconvex layer.

Method for Measuring Total Layer Thickness

The total layer thickness can be measured by transmission observation of the cross-section of the optical laminate under a confocal laser microscope (LeicaTCS-NT, manufactured by Leica: magnification "300 to 1000 times") to determine whether or not the interface is present, and determining the thickness according to the following measurement standard. Specifically, in order to provide a halation-free sharp image, a wet objective lens was used in a confocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear.

Measurement Procedure

1: The average thickness of the layer was measured by observation under a laser microscope.
2: The measurement was carried out under the above conditions.
3: For one image plane, the layer thickness from the base material to the maximum profile peak (convex) part in the concavoconvexes was measured for one point, and the layer thickness from the base material to the minimum valley (concave) part in the concavoconvexes was measured for one point. That is, the layer thickness was measured for two points in total for one image plane. This measurement was carried out for five image planes, that is, 10 points in total, and the average value was determined and was regarded as the total layer thickness. In this laser microscope, by virtue of the difference in refractive index between the layers, nondestructive cross-sectional observation can be carried out. Accordingly, likewise, if the refractive index difference is unclear or is a value close to 0 (zero), then the thickness of the anti-dazzling layer and the surface modifying layer can be determined by observation of five image planes using observation of the cross-sectional photographs of SEM and TEM observable by the difference in composition between the layers in the same manner as described above.

II. Optical Laminate

Properties
1) Haze Value

The optical laminate according to the present invention satisfies all the following numerical value requirements. In the following numerical value requirements, Ha represents the whole haze value of the optical laminate; and Hi represents the internal haze value of the optical laminate. Hs represents the surface haze value of the optical laminate.

Ha is more than 0% and less than 8%. Preferably, the lower limit of Ha is 0.5%, more preferably 1.5%, and the upper limit of Ha is 7%, more preferably 6%.

Hi is more than 0% and not more than 6%. Preferably, the lower limit of Hi is 0.1%, more preferably 0.3%, and the upper limit of Hi is preferably 5%.

In the outermost surface of an actual display provided with an anti-dazzling layer of which the Ha and Hi values are in the above-defined respective ranges, the whiteness of possessed by the display surface per se does not appear both on the outermost surface (whitening) and in the inside of the display (opacification by internal scattering). Accordingly, satisfactory black color reproduction and excellent contrast can be realized. In particular, when an anti-dazzling film having an internal haze is used in a front filter for PDPs, it is generally said that the contrast is lowered making it difficult to provide black color reproduction. This difficulty, however, can be overcome by allowing the internal haze to fall within the haze value specified in the present invention, and, in this case, in particular, the black color reproduction can be realized.

Hi/Ha is not less than 0.013 and less than 0.8. Preferably, the lower limit of Hi/Ha is 0.1, more preferably 0.2, and the upper limit of Hi/Ha is preferably 0.78. When the Hi/Ha value is in the above-defined range, the surface haze Hs and the internal haze Hi are regulated to the above-defined range, although the reason for this has not been fully elucidated yet. As a result, it is considered that black color reproduction free from milky-white feeling can be realized while providing anti-dazzling properties. Accordingly, the regulation of the Hi/Ha value to the above-defined range can realize the production of preferred optical laminates which exhibit optical properties optimal for all of liquid crystal, PDP, CRT, ELD and other panels.

In a preferred embodiment of the present invention, Hs is not less than 0.1% and not more than 7.5%. Preferably, the lower limit of Hs is 0.1%, and the upper limit of Hs is 3%.

2) Sm, θa, Rz, and Ra

The optical laminate according to the present invention preferably satisfies the following numerical value requirements. In the following numerical value requirements, Sm represents the average spacing of concavoconvexes or profile irregularities in the anti-dazzling layer; θa represents the average inclination angle of the concavoconvexes or profile irregularities; Rz represents the average roughness of the concavoconvexes, and Ra represents the arithmetical mean roughness.

Sm is not less than 60 μg/m and not more than 500 μm. Preferably, the lower limit of Sm is 100 μm, and the upper limit of Sm is 450 μm.

θa is not less than 0.1 degree and not more than 3.5 degrees. Preferably, the lower limit of θa is 0.3 degree, and the upper limit of θa is 0.9 degree.

Rz is more than 0.2 μm and not more than 5.0 μm. Preferably, the lower limit of Rz is 0.4 μm, and the upper limit of Rz is 1.6 μm.

Ra is more than 0.1 μm and not more than 0.4 μm. Preferably, the upper limit of Ra is 0.2 μm.

In particular, in order to maintain good black color reproduction in a light room, a concavoconvex shape satisfying the following requirements is preferred: Sm=not less than 100 μm and not more than 450 μm, θa=not less than 0.3 degree and not more than 0.8 degree, Rz=not less than 0.4 μm and not more than 1.6 μm, and Ra=not less than 0.1 μm and not more than 0.25 μm.

Layer Construction

The optical laminate according to the present invention will be described with reference to FIG. 1. FIG. 1 is a cross-sectional view of an optical laminate according to the present invention. An anti-dazzling layer 2 is provided on the upper surface of a light transparent base material 1. In a preferred embodiment of the present invention, the anti-dazzling layer comprises first fine particles A (which may be unshaped fine particles different from the spherical fine particles shown in FIG. 1 or may be aggregated) or a combination of first fine particles A and second fine particles B (which may be aggregated) or a combination of the above two types of fine particles A and B and third fine particles (which may be aggregated). In a preferred embodiment of the present invention, an optical laminate comprising an anti-dazzling layer 2 and a low-refractive index layer 3 having a lower refractive index than the anti-dazzling layer 2 provided on the surface of the anti-dazzling layer 2 is preferred.

Figure 2:
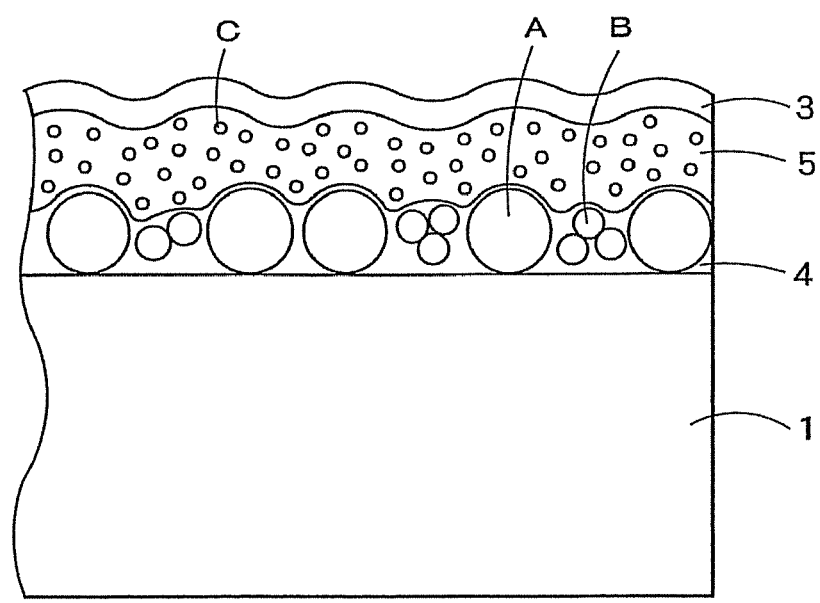
FIG. 2 is a schematic cross-sectional view of an optical laminate according to the present invention.

Still another embodiment of the optical laminate according to the present invention will be described with reference to FIG. 2. FIG. 2 is a cross-sectional view of an optical laminate according to the present invention. An anti-dazzling layer 2, which functions both as a substrate concavoconvex layer 4 and a surface modifying layer 5, provided on the upper surface of the light transparent base material 1. In a preferred embodiment of the present invention, the substrate concavoconvex layer 4 comprises first fine particles A and second fine particles B (which may be aggregated) or comprises the above two types of fine particles A and B and third fine particles (which may be aggregated). Further, preferably, the surface modifying layer 5 comprises a fluidity modifying agent C. Furthermore, preferably, a low-refractive index layer 3 having a lower refractive index than the surface modifying layer 5 is formed onto the surface modifying layer 5.

Accordingly, it is understood that the anti-dazzling layer according to the present invention includes an anti-dazzling layer having a single layer structure, or an anti-dazzling layer comprising a substrate concavoconvex layer and a surface modifying layer provided on the substrate concavoconvex layer. Therefore, in the present invention, the "anti-dazzling layer" means both a layer comprising an anti-dazzling layer having a single layer structure (not provided with a substrate concavoconvex layer) and optionally an optical functional layer, or a layer comprising a substrate concavoconvex layer and a surface modifying layer and optionally an optical functional layer. Both the anti-dazzling layer and the substrate concavoconvex layer may be formed from substantially the same material by substantially the same method.

1. Anti-Dazzling Layer

In the present invention, an anti-dazzling layer is provided on the light transparent base material. Preferably, the optical laminate has on its surface an anti-dazzling layer having a concavoconvex shape. The anti-dazzling layer may consist of a resin only. Preferably, the anti-dazzling layer is formed of a resin and fine particles. The thickness H μm of the anti-dazzling layer is not less than 2 μm and not more than 30 μm. Preferably, the lower limit of the layer thickness H μm is 3 μm, and the upper limit of the layer thickness H μm is 20 μm.

1) Difference n in Refractive Index of Anti-Dazzling Layer Formed Using Composition for Anti-Dazzling Layer, Comprising Resin and Fine Particles In the present invention, the difference n in refractive index between the resin and the fine particles is preferably not more than 0.20. More specifically, the refractive index difference n is not less than 0.03 and not more than 0.20. Preferably, the lower limit of the refractive index difference n is 0.05, more preferably 0.09, and the upper limit of the refractive index difference n is 0.18, more preferably 0.12. When the difference n in refractive index between the resin and the fine particles falls within the above-defined range, the internal haze of the optical laminate can be imparted and uneven image in LCDs and the like and scintillation caused upon the transmission of light such as backlight transmitted through the optical laminate having a concavoconvex shape on its surface from its backside can be effectively prevented. The term "scintillation" as used herein means a phenomenon seen by the eye as twinkling flickering.

On the other hand, in another preferred embodiment of the present invention, the difference n in refractive index between the resin and the fine particles is more than 0 and less than 0.03. The lower limit of the refractive index difference n is preferably 0.001, more preferably 0.005, and the upper limit of the refractive index difference n is preferably 0.02, more preferably 0.01. When the difference n in refractive index between the resin and the fine particles is in the above-defined range, a high contrast can be realized.

In the present invention, the difference n in refractive index between the resin and the fine particles is defined in the above two numerical range levels. This is not technically contradictory, because the above two numerical range levels are necessary for realizing respective desired optical properties as the optical laminate, particularly on which the optical laminate of the present invention is mounted, for realizing optical properties optimal for modes in individual liquid crystal, PDP, CRT or other panels.

Fine Particles

The fine particles may be in a spherical, for example, truly spherical, elliptical form, or irregular shape. The fine particles may be aggregation-type fine particles. In the present invention, the average particle diameter R (μm) of the fine particles is not less than 0.3 μm and not more than 20 μm. Preferably, the upper limit of the average particle diameter R is 15.0 μm, more preferably 10 μm, still more preferably 7.0 μm, and the lower limit of the average particle diameter R is 1.0 μm, more preferably 1.5 μm. When the average particle diameter R of the fine particles is in the above-defined range, advantageously, a proper concavoconvex shape can be formed, and a preferred thickness range can be realized in the anti-dazzling layer. The "average particle diameter" is an average particle diameter when the fine particles are monodisperse particles (particles having a single shape). When the particles have a broad particle size distribution, the diameter of particles which occupy the largest proportion of the particles as determined by particle size distribution measurement is regarded as the average particle diameter. The particle diameter of the fine particles may be mainly measured by a Coulter counter method. Further, in addition to the above method, laser diffractometry and SEM photographing may also be adopted.

In the present invention, when monodisperse particles are used, not less than 80% (preferably not less than 90%) of the whole fine particles is preferably accounted for by fine particles having an average particle diameter distribution of R±1.0 μm, preferably R±0.5 μm, more preferably R±0.3 μm. When the average particle diameter distribution of the fine particles falls within the above-defined range, the evenness of the concavoconvex shape of the anti-dazzling laminate can be rendered good and, at the same time, scintillation and the like can be effectively prevented. Further, the fine particle system may be such that the above fine particles are used as first fine particles, and a plurality of types of fine particles having an average particle diameter different from the first fine particles, for example, second fine particles, third fine particles or nth fine particles, wherein n is a natural number, are further included. For example, for small first fine particles of which the average particle diameter R (μm) is approximately 3.5 μm, a concavoconvex layer can be efficiently formed using fine particles having a particle size distribution with the average particle diameter being 1.5 μm rather than monodisperse fine particles. When a plurality of types of fine particles different from each other in average particle diameter are contained, the average particle diameter of each of the second, third and nth fine particles is preferably in the same average particle diameter range as the above fine particles (first fine particles). When the fine particles used have a broad particle size distribution, it would be understood to a person having an ordinary skill in the art that the average particle size distribution is not as described above.

In the present invention, preferably, the fine particles and the resin satisfy a requirement for the total weight ratio per unit area between the fine particles and the resin of m/M=not less than 0.01 and not more than 1.2 wherein m represents the total weight of the fine particles per unit area (when a plurality of types of fine particles are present, the total of each type of fine particles); and M represents the total weight of the resin per unit area. Preferably, the lower limit of the m/M value is 0.012, more preferably 0.015, and the upper limit of the m/M value is 1.0, more preferably 0.3.

Aggregation-Type Fine Particles

In the present invention, aggregation-type fine particles among the fine particles may be used. The aggregation-type fine particles may be identical fine particles, or alternatively may be a plurality of types of fine particles different from each other in average particle diameter. Accordingly, when a plurality of types of aggregated fine particles are used, the fine particle system may comprise (aggregated) first fine particles, and (aggregated) second fine particles, (aggregated) third fine particles, or (aggregated) nth fine particles, wherein n is a natural number, which are different from the first fine particles in average particle diameter. When the (aggregated) second fine particles, (aggregated) third fine particles, or (aggregated) nth fine particles are used, preferably, these particles as such or the aggregated part as such do not exhibit anti-dazzling properties in the anti-dazzling layer. In the case of the aggregation-type fine particles, preferably, the secondary particle diameter falls within the above average particle diameter range.

In another embodiment of the present invention, preferably, the total weight ratio per unit area among the resin, the first fine particles, and the second fine particles satisfies requirements represented by the following formula:

$$0.08 \leq (M_1+M_2)/M \leq 0.38$$

$$0 \leq M_2 \leq 4.0 M_1$$

wherein $M_1$ represents the total weight of the first fine particles per unit area; $M_2$ represents the total weight of the second fine particles per unit area; and M represents the total weight of the resin per unit area.

In another preferred embodiment of the present invention, a requirement represented by the following formula is satisfied:

$$\Delta n = |n_1 - n_3| < 0.15 \text{ and/or } \Delta n = |n_2 - n_3| < 0.18$$

wherein $n_1$, $n_2$, and $n_3$ represent the refractive indexes of the first fine particles, the second fine particles, and the resin, respectively.

The fine particles (first, second, third, and nth fine particles) are not particularly limited. They may be of inorganic type and organic type and are preferably transparent. Specific examples of fine particles formed of an organic material include plastic polymer beads. Plastic beads include polystyrene beads (refractive index 1.60), melamine beads (refractive index 1.57), acrylic beads (refractive index 1.49 to 1.535), acryl-styrene beads (refractive index 1.54 to 1.58), benzoguanamine-formaldehyde condensate beads (refractive index 1.66), benzoguanamine melamine formaldehyde condensate beads (refractive index 1.52 to 1.66), melamine formaldehyde condensate beads (refractive index 1.66), polycarbonate beads, and polyethylene beads. Preferably, the plastic bead has a hydrophobic group on its surface, and, for example, styrene beads may be mentioned. For example, spherical silica and amorphous silica may be mentioned as the inorganic fine particle.

Silica beads having a particle diameter of 0.3 to 5 μm and having good dispersibility are preferred as the amorphous silica. The content of the amorphous silica is preferably 0.5 to 30 parts by mass based on the binder resin. In this case, the increase in viscosity of the composition for an anti-dazzling layer can be suppressed to render the dispersibility of the amorphous silica good. Further, in the present invention, the surface of the particles may be treated with an organic material or the like. The treatment of the surface of the particles with an organic material is preferably hydrophobicization.

The organic material treatment may be carried out by any of a chemical method in which a compound is chemically bonded to the surface of the bead, and a physical method in which a compound is impregnated into voids or the like present in the composition constituting the bead without chemical bonding to the bead surface. In general, a chemical treatment method utilizing an active group present on silica surface, for example, hydroxyl group or silanol group, is preferably used from the viewpoint of treatment efficiency.

Specific examples of compounds usable for the treatment include silane-type, siloxane-type, and silazane-type materials highly reactive with the active group, for example, straight chain alkyl monosubstituted silicone materials such as methyltrichlorosilane, branched alkyl monosubstituted silicone materials, or polysubstituted straight chain alkylsilicone compounds and polysubstituted branched chain alkylsilicone compounds such as di-n-butyldichlorosilane and ethyldimethylchlorosilane. Likewise, straight chain alkyl group or branched alkyl group monosubstituted or polysubstituted siloxane materials and silazane materials can also be effectively used.

According to the necessary function, the end or intermediate site of the alkyl chain may have a hetero atom, an unsaturated bond group, a cyclic bond group, an aromatic functional group or other group. In these compounds, the alkyl group contained therein is hydrophobic. Accordingly, the surface of the object material to be treated can easily be converted from a hydrophilic property to a hydrophobic property. As a result, even in the case of polymer materials having poor affinity in the untreated state, a high level of affinity can be realized.

When a plurality of types of fine particles are used as a mixture, fine particles different from each other in average particle diameter and, further, some of or all of material and shape are properly selected and used while taking the functions of the plurality of types of fine particles into consideration as described above.

Regarding the plurality of types of fine particles different from each other in material, the use of two or more types of fine particles different from each other in refractive index is preferred. When these fine particles are mixed together, the refractive index of the fine particles may be regarded as an average value dependent upon the refractive index of each type of fine particles and the ratio of use of each type of fine particles. The regulation of the mixing ratio of the fine particles can realize detailed refractive index setting. In this case, the control of the refractive index is easier than the case where a single type of fine particles is used, and, consequently, various refractive index designs are possible. For example, when two types of fine particles different from each other in refractive index are used, a relationship of the average particle diameter R1 of the first fine particles>the average particle diameter R2 of the second fine particles is preferably satisfied. Alternatively, in this case, the two types of fine particles may be identical to each other in particle diameter. In this case, the ratio between the first fine particles and the second fine particles can be freely selected. This facilitates the design of light diffusing properties. In order to render the particle diameter of the first fine particles and the particle diameter of the second fine particles identical to each other, the use of organic fine particles which can easily provide monodisperse particles is preferred. The lower the level of variation of the particle diameter, advantageously the lower the level of variation in anti-dazzling properties and internal scattering properties and the easier the optical property design of the anti-dazzling layer. Means for further improving monodispersibility include pneumatic classification and wet filtration classification by a filter.

Antistatic Agent (Electroconductive Agent)

The anti-dazzling layer according to the present invention may contain an antistatic agent (an electroconductive agent). Dust adhesion to the surface of the optical laminate can be effectively prevented by adding an electroconductive agent. Specific examples of antistatic agents (electroconductive agents) include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin, and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent.

Further, electroconductive fine particles may be mentioned as the antistatic agent. Specific examples of electroconductive fine particles include fine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

Electroconductive polymers may be mentioned as another specific example of the antistatic agent (electroconductive agent), and the electrostatic polymer is not particularly limited and may be at least one polymer selected from the group consisting of aliphatic conjugated polyacetylenes, polyacenes, and polyazulenes; aromatic conjugated polyphenylenes; heterocyclic conjugated polypyrroles, polythiophenes, and polyisocyanaphthenes; heteroatom-containing conjugated polyanilines and polythienylenevinylenes; mixture-type conjugated poly(phenylenevinylenes), double-chain conjugated systems which are conjugated systems having a plurality of conjugated chains in the molecule thereof, their electroconductive polymer derivatives, and electroconductive composites which are polymers prepared by grafting or block-copolymerizing the above conjugated polymer chain onto a saturated polymer. Among others, the use of organic antistatic agents such as polythiophene, polyaniline, and polypyrrole is more preferred. The use of the organic antistatic agent can realize the development of excellent antistatic properties and, at the same time, can enhance the total light transmittance of the optical laminate, and can lower the haze value. Further, with a view to improving the electroconductivity and improving the antistatic properties, anions of an organic sulfonic acid, iron chloride or the like may also be added as a dopant (an electron donating agent). Based on dopant addition effect, polythiophene has a high level of transparency and a high level of antistatic properties and thus is particularly preferred. Oligothiophene is also suitable as the polythiophene. The above derivatives are not particularly limited, and examples thereof include alkyl substitutes of polyphenylacetylene and polydiacetylene.

Resin

The anti-dazzling layer according to the present invention may be formed from a (curing-type) resin. The curing-type resin is preferably transparent, and specific examples thereof are classified into three groups, that is, ionizing radiation curing resins which are curable upon exposure to ultraviolet light or electron beams, mixtures of ionizing radiation curing resins with solvent drying resins (resins which can be brought to a film by merely removing a solvent by drying for regulating the solid content in the coating, for example, thermoplastic resins), or heat curing resins. Preferred are ionizing radiation curing resins. In a preferred embodiment of the present invention, the resin comprises at least an ionizing radiation curing resin and a heat curing resin.

Specific examples of ionizing radiation curing resins include compounds containing a radical polymerizable functional group such as an (meth)acrylate group, for example, (meth)acrylate oligomers, prepolymers, or monomers. Specific examples thereof include oligomers or prepolymers of relatively low-molecular weight polyester resins, polyether resins, acrylic resins, epoxy resins, urethane resins, alkyd resins, spiroacetal resins, polybutadiene resins, and polythiol polyene resins and (meth)acrylic esters of polyfunctional compounds such as polyhydric alcohols. Specific examples of monomers include ethyl(meth)acrylate, ethylhexyl(meth)acrylate, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate. The term "(meth)acrylate" means acrylate or methacrylate.

Examples of compounds other than the (meth)acrylate compound include monofunctional or polyfunctional monomers such as styrene, methylstyrene, and N-vinylpyrrolidone, or cation polymerizable functional group-containing compounds, for example, oligomers and prepolymers of bisphenol-type epoxy compounds, novolak-type epoxy compounds, aromatic vinyl ethers, and aliphatic vinyl ethers.

For example, acetophenones, benzophenones, Michler's benzoyl benzoate, α-amyloxime ester, tetramethylthiuram monosulfide, and thioxanthones may be applied as the photopolymerization initiator to be added to the ionizing radiation curing resin composition. If necessary, photosensitizers and photopolymerization accelerators are added to the ionizing radiation curing resin composition. Conventional photosensitizers and photopolymerization accelerators may be used as the photosensitizer and photopolymerization accelerator, and examples thereof include benzoin compounds such as benzoin, benzoin methyl ether, benzoin ethyl ether, benzoin isopropyl ether, α-methylbenzoin, and α-phenylbenzoin; anthraquinone compounds such as anthraquinone and methylanthraquinone; benzyl; diacetyl; phenyl ketone compounds such as acetophenone and benzophenone; sulfide compounds such as diphenyl disulfide and tetramethylthiuram sulfide; α-chloromethyl naphthalene; anthracene; halogenated hydrocarbons such as hexachlorobutadiene and pentachlorobutadiene; thioxanthone; n-butylamine; triethylamine; and tri-n-butylphosphine. Benzophenon or thioxanthone photosensitizers are preferred as the acetophenone photopolymerization initiators.

The solvent drying-type resin used as a mixture with the ionizing radiation curing resin is mainly a thermoplastic resin. Commonly exemplified thermoplastic resins are usable. Coating defects of the coated face can be effectively prevented by adding the solvent drying-type resin.

In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose. When the cellulosic resin is used, the adhesion between the light transparent base material and the antistatic layer (if any) and transparency can be improved.

Further, in the present invention, in addition to the above-described resins, vinyl resins such as vinyl acetate and its copolymers, vinyl chloride and its copolymers, and vinylidene chloride and its copolymers, acetal resins such as polyvinylformal and polyvinylbutyral, acrylic resins such as acrylic resin and its copolymers and methacrylic resin and its copolymers, polystyrene resins, polyamide resins, and polycarbonate resins may be mentioned.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Leveling Agent

Fluoro- or silicone-type or other leveling agents may be added to the composition for an anti-dazzling layer according to the present invention. The composition for an anti-dazzling layer to which the leveling agent has been added, advantageously has contamination preventive properties and scratch resistance. Preferably, the leveling agent is utilized in film-shaped light transparent base materials (for example, triacetylcellulose) which should be resistant to heat.

Method for Anti-Dazzling Layer Formation

The anti-dazzling layer may be formed by mixing fine particles or aggregation-type fine particles (preferably first fine particles and second fine particles, or first fine particles, second fine particles and third fine particles) and the resin in proper solvents, for example, toluene, xylene, cyclohexanone, methyl acetate, ethyl acetate, butyl acetate, propyl acetate, MEK (methyl ethyl ketone), and MIBK (methyl isobutyl ketone) to prepare a composition for an anti-dazzling layer or a composition for a substrate concavoconvex layer, and then coating the composition onto a light transparent base material.

Proper solvents include: alcohols such as methanol, ethanol, isopropyl alcohol, butanol, isobutyl alcohol, methyl glycol, methyl glycol acetate, methyl cellosolve, ethyl cellosolve, or butyl cellosolve; ketones such as acetone, methyl ethyl ketone, methyl isobutyl ketone, cyclohexanone, or diacetone alcohol; esters such as methyl formate, methyl acetate, ethyl acetate, ethyl lactate, or butyl acetate; nitrogen-containing compounds such as nitromethane, N-methylpyrrolidone, or N,N-dimethylformamide; ethers such as diisopropyl ether, tetrahydrofuran, dioxane, or dioxolane; halogenated hydrocarbons such as methylene chloride, chloroform, trichloroethane, or tetrachloroethane; other solvents such as dimethyl sulfoxide or propylene carbonate; or mixtures thereof. More preferred solvents include methyl acetate, ethyl acetate, butyl acetate, methyl ethyl ketone, methyl isobutyl ketone, or cyclohexanone.

Methods usable for coating the composition for an anti-dazzling layer onto the light transparent base material include coating methods such as roll coating, Mayer bar coating, and gravure coating. Coating the composition for an anti-dazzling layer or the composition for a substrate concavoconvex layer is followed by drying and ultraviolet curing. Specific examples of ultraviolet light sources include light sources, for example, ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators. The resin is cured, and the fine particles in the resin are fixed to form a desired concavoconvex shape on the outermost surface of the anti-dazzling layer or the substrate concavoconvex layer.

2) Anti-Dazzling Layer Formed Using Composition for Anti-Dazzling Layer, Free from Fine Particles and Containing Resin and the Like In the present invention, the anti-dazzling layer may be formed by mixing at least one polymer with at least one curable resin precursor in a proper solvent to prepare a composition for an anti-dazzling layer and applying the composition onto a light transparent base material. This anti-dazzling layer may be the same as described above in the column of 1) Anti-dazzling layer formed using composition for anti-dazzling layer, comprising resin and fine particles, expect that the anti-dazzling agent is not used.

Polymer

The polymer may be a plurality of polymers which can be phase separated by a spinodal decomposition, for example, a cellulose derivative and a styrenic resin, an (meth)acrylic resin, an alicyclic olefinic resin, a polycarbonate resin, a polyester resin or the like, or a combination thereof. The curable resin precursor may be compatible with at least one polymer in the plurality of polymers. At least one of the plurality of polymers may have a functional group involved in a curing reaction of the curable resin precursor, for example, a polymerizable group such as an (meth)acryloyl group. In general, a thermoplastic resin is used as the polymer component.

Specific examples of thermoplastic resins include styrenic resins, (meth)acrylic resins, organic acid vinyl ester resins, vinyl ether resins, halogen-containing resins, olefinic resins (including alicyclic olefinic resins), polycarbonate resins, polyester resins, polyamide resins, thermoplastic polyurethane resins, polysulfone resins (for example, polyethersulfone and polysulfone), polyphenylene ether resins (for example, polymers of 2,6-xylenol), cellulose derivatives (for example, cellulose esters, cellulose carbamates, and cellulose ethers), silicone resins (for example, polydimethylsiloxane and polymethylphenylsiloxane), and rubbers or elastomers (for example, diene rubbers such as polybutadiene and polyisoprene, styrene-butadiene copolymers, acrylonitrile-butadiene copolymers, acrylic rubbers, urethane rubbers, and silicone rubbers). They may be used either solely or in a combination of two or more.

Specific examples of styrenic resins include homopolymers or copolymers of styrenic monomers (for example, polystyrenes, styrene-α-methylstyrene copolymers, and styrene-vinyltoluene copolymers) and copolymers of styrenic monomers with other polymerizable monomers (for example, (meth)acrylic monomers, maleic anhydride, maleimide monomers, or dienes). Styrenic copolymers include, for example, styrene-acrylonitrile copolymers (AS resins), copolymers of styrene with (meth)acrylic monomers (for example, styrene-methyl methacrylate copolymers, styrene-methyl methacrylate-(meth)acrylic ester copolymers, or styrene-methyl methacrylate-(meth)acrylic acid copolymers), and styrene-maleic anhydride copolymers. Preferred styrenic resins include copolymers of polystyrene or styrene with (meth)acrylic monomers (for example, copolymers composed mainly of styrene and methyl methacrylate, for example, styrene-methyl methacrylate copolymers), AS resins, and styrene-butadiene copolymers.

For example, homopolymers or copolymers of (meth)acrylic monomers and copolymers of (meth)acrylic monomers with copolymerizable monomers may be mentioned as the (meth)acrylic resin. Specific examples of (meth)acrylic monomers include (meth)acrylic acid; $C_{1-10}$ alkyl(meth)acrylates such as methyl(meth)acrylate, ethyl(meth)acrylate, butyl(meth)acrylate, t-butyl(meth)acrylate, isobutyl(meth)acrylate, hexyl(meth)acrylate, octyl(meth)acrylate, and 2-ethylhexyl(meth)acrylate; aryl(meth)acrylates such as phenyl(meth)acrylate; hydroxyalkyl(meth)acrylate such as hydroxyethyl(meth)acrylate and hydroxypropyl(meth)acrylate; glycidyl(meth)acrylate; N,N-dialkylaminoalkyl(meth)acrylate; (meth)acrylonitrile; and (meth)acrylates containing an alicyclic hydrocarbon group such as tricyclodecane. Specific examples of copolymerizable monomers include the above styrenic monomers, vinyl ester monomers, maleic anhydride, maleic acid, and fumaric acid. These monomers may be used either solely or in a combination of two or more.

Specific examples of (meth)acrylic resins include poly(meth)acrylic esters such as polymethyl methacrylate, methyl methacrylate-(meth)acrylic acid copolymers, methyl methacrylate-(meth)acrylic ester copolymers, methyl methacrylate-acrylic ester-(meth)acrylic acid copolymers, and (meth)acrylic ester-styrene copolymers (for example, MS resins). Specific examples of preferred (meth)acrylic resins include poly-$C_{1-6}$ alkyl(meth)acrylates such as polymethyl (meth)acrylate. In particular, methyl methacrylate resins composed mainly of methyl methacrylate (approximately 50 to 100% by weight, preferably 70 to 100% by weight) may be mentioned.

Specific examples of organic acid vinyl ester resins include homopolymers or copolymers of vinyl ester monomers (for example, polyvinyl acetate and polyvinyl propionate), copolymers of vinyl ester monomers with copolymerizable monomers (for example, ethylene-vinyl acetate copolymers, vinyl acetate-vinyl chloride copolymers, and vinyl acetate-(meth)acrylic ester copolymers), or their derivatives. Specific examples of vinyl ester resin derivatives include polyvinyl alcohol, ethylene-vinyl alcohol copolymers, and polyvinylacetal resins.

Specific examples of vinyl ether resins include homopolymers or copolymers of vinyl $C_{1-10}$ alkyl ethers such as vinyl methyl ether, vinyl ethyl ether, vinyl propyl ether, or vinyl t-butyl ether, and copolymers of vinyl $C_{1-10}$ alkyl ethers with copolymerizable monomers (for example, vinyl alkyl ether-maleic anhydride copolymers). Specific examples of halogen-containing resins include polyvinyl chloride, polyfulorinated vinylidenes, vinyl chloride-vinyl acetate copolymers, vinyl chloride-(meth)acrylic ester copolymers, and vinylidene chloride-(meth)acrylic ester copolymers.

Specific examples of olefinic resins include homopolymers of olefins such as polyethylene and polypropylene, and copolymers such as ethylene-vinyl acetate copolymers, ethylene-vinyl alcohol copolymers, ethylene-(meth)acrylic acid copolymers, and ethylene-(meth)acrylic ester copolymers. Specific examples of alicyclic olefinic resins include homopolymers or copolymers of cyclic olefins (for example, norbornene and dicyclopentadiene) (for example, polymers containing an alicyclic hydrocarbon group such as tricyclodecane which is sterically rigid), and copolymers of the above cyclic olefins with copolymerizable monomers (for example, ethylene-norbornene copolymers and propylene-norbornene copolymers). Specific examples of alicyclic olefinic resins include those which are available, for example, under the tradenames "ARTON" and "ZEONEX."

Specific examples of polycarbonate resins include aromatic polycarbonates based on bisphenols (for example, bisphenol A), and aliphatic polycarbonates such as diethylene glycol bisallyl carbonates. Specific examples of polyester resins include aromatic polyesters using aromatic dicarboxylic acids such as terephthalic acid, for example, homopolyesters, for example, poly-$C_{2-4}$-alkylene terephthalates and poly-$C_{2-4}$-alkylene naphthalates including polyethylene terephthalate and polybutylene terephthalate, and copolyesters comprising as a main component (for example, not less than 50% by weight) $C_{2-4}$ alkylene arylate units ($C_{2-4}$ alkylene terephthalate and/or $C_{2-4}$ alkylene naphthalate units). Specific examples of copolyesters include copolyesters in which, in the constituent units of poly-$C_{2-4}$-alkylene arylate, a part of $C_{2-4}$ alkylene glycol has been replaced, for example, with a polyoxy-$C_{2-4}$-alkylene glycol, a $C_{6-10}$ alkylene glycol, an alicyclic diol (for example, cyclohexanedimethanol or hydrogenated bisphenol A), an aromatic ring-containing diol (for example, 9,9-bis(4-(2-hydroxyethoxy)phenyl)fluorene having a fluorenone side chain, bisphenol A, or a bisphenol A-alkylene oxide adduct), and copolyesters in which a part of aromatic dicarboxylic acid has been replaced, for example, with an asymmetric aromatic dicarboxylic acid such as phthalic acid or isophthalic acid, or an aliphatic $C_{6-12}$ dicarboxylic acid such as adipic acid. Specific examples of polyester resins include polyarylate resins, aliphatic polyesters using aliphatic dicarboxylic acids such as adipic acid, and homopolymers or copolymers of lactones such as ∈-caprolactone. Preferred polyester resins are generally noncrystalline polyester resins such as noncrystalline copolyesters (for example, $C_{2-4}$ alkylene arylate copolyesters).

Specific examples of polyamide resins include aliphatic polyamides such as nylon 46, nylon 6, nylon 66, nylon 610, nylon 612, nylon 11, and nylon 12, and polyamides produced from dicarboxylic acids (for example, terephthalic acid, isophthalic acid, or adipic acid) and diamines (for example, hexamethylenediamine or metaxylylenediamine). Specific examples of polyamide resins include homopolymers or copolymers of lactams such as ∈-caprolactam. The polyamide resins may be either homopolyamides or copolyamides.

Specific examples of cellulose esters among the cellulose derivatives include, for example, aliphatic organic acid esters, for example, cellulose acetates such as cellulose diacetate and cellulose triacetate; and $C_{1-6}$ organic acid esters such as cellulose propionate, cellulose butyrate, cellulose acetate propionate, and cellulose acetate butyrate. Further examples thereof include aromatic organic acid esters ($C_{7-12}$ aromatic carboxylic esters such as cellulose phthalate and cellulose benzoate) and inorganic acid esters, (for example, cellulose phosphate and cellulose sulphate). Mixed acid esters such as acetic acid-nitric acid cellulose ester may also be used. Specific examples of cellulose derivatives include cellulose carbamates (for example, cellulose phenylcarbamate) and further include cellulose ethers, for example, cyanoethylcellulose; hydroxy-$C_{2-4}$-alkylcelluloses such as hydroxyethylcellulose and hydroxypropylcellulose; $C_{1-6}$ alkylcelluloses such as methylcellulose and ethylcellulose; and carboxymethylcellulose or its salt, benzylcellulose, and acetylalkylcellulose.

Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. Resins, which are usually noncrystalline and soluble in organic solvents (particularly common solvents which can dissolve a plurality of polymers or curable compounds), may be used as such resins. Particularly preferred are, for example, resins having a high level of moldability or film formability, transparency and weathering resistance, for example, styrenic resins, (meth)acrylic resins, alicyclic olefinic resins, polyester resins, and cellulose derivatives (for example, cellulose esters).

Polymers containing a functional group involved in a curing reaction (or a functional group reactive with a curable compound) are also usable as the polymer component. The polymers may contain a functional group in the main chain or side chain. The functional group may be introduced into the main chain, for example, by copolymerization or co-condensation. In general, however, the functional group is introduced into the side chain. Specific examples of such functional groups include condensable groups and reactive groups (for example, hydroxyl group, acid anhydride group, carboxyl group, amino group or imino group, epoxy group, glycidyl group, and isocyanate group), polymerizable groups (for example, $C_{2-6}$ alkenyl groups such as vinyl, propenyl, isopropenyl, butenyl and allyl groups, $C_{2-6}$ alkynyl groups such as ethynyl, propynyl, and butynyl groups, and $C_{2-6}$ alkenylidene groups such as vinylidene groups), or groups containing these polymerizable groups (for example, (meth)acryloyl group). Among these functional groups, polymerizable groups are preferred.

The polymerizable group may be introduced into the side chain, for example, by reacting a thermoplastic resin containing a functional group such as a reactive group or a condensable group with a polymerizable compound containing a group reactive with the functional group.

Examples of such functional group-containing thermoplastic resins include thermoplastic resins containing a carboxyl group or its acid anhydride group (for example, (meth)acrylic resins, polyester resins, and polyamide resins), hydroxyl group-containing thermoplastic resins (for example, (meth)acrylic resins, polyurethane resins, cellulose derivatives, and polyamide resins), amino group-containing thermoplastic resins (for example, polyamide resins), epoxy group-containing thermoplastic resins (for example, epoxy group-containing (meth)acrylic resins and polyester resins). Resins comprising the above functional group introduced into thermoplastic resins such as styrenic resins, olefinic resins, or alicyclic olefinic resins by copolymerization or graft polymerization are also possible.

Regarding the polymerizable compound, thermoplastic resins containing a carboxyl or its acid anhydride group include polymerizable compounds containing epoxy, hydroxyl, amino, or isocyanate groups. Hydroxyl group-containing thermoplastic resins include polymerizable compounds containing carboxyl groups or acid anhydride groups thereof or isocyanate groups. Amino group-containing thermoplastic resins include polymerizable compounds containing carboxyl groups or acid anhydride groups thereof, epoxy groups, or isocyanate groups. Epoxy group-containing thermoplastic resins include polymerizable compounds containing carboxyl groups or acid anhydride groups thereof or amino groups.

Among the above polymerizable compounds, epoxy group-containing polymerizable compounds include, for example, epoxycyclo-$C_{5-8}$-alkenyl(meth)acrylates such as epoxycyclohexenyl(meth)acrylate, glycidyl(meth)acrylate, and allyl glycidyl ether. Hydroxyl group-containing compounds include, for example, hydroxy-$C_{1-4}$-alkyl(meth)acrylates such as hydroxypropyl(meth)acrylate, and $C_{2-6}$ alkylene glycol (meth)acrylates such as ethylene glycol mono(meth) acrylate. Amino group-containing polymerizable compounds include, for example, amino-$C_{1-4}$-alkyl(meth)acrylates such as aminoethyl (meth)acrylate, $C_{3-6}$ alkenylamines such as allylamine, and aminostyrenes such as 4-aminostyrene and diaminostyrene. Isocyanate group-containing polymerizable compounds include, for example, (poly)urethane(meth)acrylate and vinyl isocyanate. Polymerizable compounds containing carboxyl groups or acid anhydride groups thereof include, for example, unsaturated carboxylic acids or anhydrides thereof such as (meth)acrylic acid and maleic anhydride.

A combination of a thermoplastic resin containing a carboxyl group or its acid anhydride group with an epoxy group-containing compound, particularly a combination of an (meth)acrylic resin (for example, an (meth)acrylic acid-(meth)acrylic ester copolymer) with an epoxy group-containing (meth)acrylate (for example, epoxycycloalkenyl(meth) acrylate or glycidyl(meth)acrylate) may be mentioned as a representative example of the polymerizable compound. Specific examples thereof include polymers comprising a polymerizable unsaturated group introduced into a part of carboxyl groups in an (meth)acrylic resin, for example, an (meth)acrylic polymer produced by reacting a part of carboxyl groups in an (meth)acrylic acid-(meth)acrylic ester copolymer with an epoxy group in 3,4-epoxycyclohexenyl-methyl acrylate to introduce a photopolymerizable unsaturated group into the side chain (CYCLOMER P, manufactured by Daicel Chemical Industries, Ltd.).

The amount of the functional group (particularly polymerizable group) involved in a curing reaction with the thermoplastic resin introduced is approximately 0.001 to 10 moles, preferably 0.01 to 5 moles, more preferably 0.02 to 3 moles based on 1 kg of the thermoplastic resin.

These polymers may be used in a suitable combination. Specifically, the polymer may comprise a plurality of polymers. The plurality of polymers may be phase separated by liquid phase spinodal decomposition. The plurality of polymers may be incompatible with each other. When the plurality of polymers are used in combination, the combination of a first resin with a second resin is not particularly limited. For example, a plurality of polymers incompatible with each other at a temperature around a processing temperature, for example, two suitable polymers incompatible with each other may be used in combination. For example, when the first resin is a styrenic resin (for example, polystyrene or a styrene-acrylonitrile copolymer), examples of second resins usable herein include cellulose derivatives (for example, cellulose esters such as cellulose acetate propionate), (meth)acrylic resins (for example, polymethyl methacrylate), alicyclic olefinic resins (for example, polymers using norbornene as a monomer), polycarbonate resins, and polyester resins (for example, the above poly-$C_{2-4}$-alkylene arylate copolyesters). On the other hand, for example, when the first polymer is a cellulose derivative (for example, a cellulose ester such as cellulose acetate propionate), examples of second polymers usable herein include styrenic resins (for example, polystyrene or styrene-acrylonitrile copolymer), (meth)acrylic resins, alicyclic olefinic resins (for example, polymers using norbornene as a monomer), polycarbonate resins, and polyester resins (for example, the above poly-$C_{2-4}$-alkylene arylate copolyesters). In the combination of the plurality of resins, at least cellulose esters (for example, cellulose $C_{2-4}$ alkyl carboxylic esters such as cellulose diacetate, cellulose triacetate, cellulose acetate propionate, or cellulose acetate butyrate) may be used.

The phase separated structure produced by the spinodal decomposition is finally cured by the application of an actinic radiation (for example, ultraviolet light or electron beam), heat or the like to form a cured resin. By virtue of this, the scratch resistance can be imparted to the anti-dazzling layer, and the durability can be improved.

From the viewpoint of scratch resistance after curing, preferably, at least one polymer in the plurality of polymers, for example, one of mutually incompatible polymers (when the first and second resins are used in combination, particularly both the polymers) is a polymer having on its side chain a functional group reactive with a curable resin precursor.

The weight ratio between the first polymer and the second polymer may be selected, for example, from a range of first polymer/second polymer=approximately 1/99 to 99/1, preferably 5/95 to 95/5, more preferably 10/90 to 90/10 and is generally approximately 20/80 to 80/20, particularly 30/70 to 70/30.

Regarding the polymer for phase separated structure formation, in addition to the above two incompatible polymers, the above thermoplastic resins or other polymers may be incorporated.

The glass transition temperature of the polymer may be selected, for example, from a range of approximately $-100°$ C. to 250° C., preferably $-50°$ C. to 230° C., more preferably 0 to 200° C. (for example, approximately 50 to 180° C.). A glass transition temperature of 50° C. or above (for example, approximately 70 to 200° C.), preferably 100° C. or above (for example, approximately 100 to 170° C.), is advantageous from the viewpoint of the surface hardness. The weight average molecular weight of the polymer may be selected, for example, from a range of approximately not more than 1,000, 000, preferably 1,000 to 500,000.

Curable Resin Precursor

The curable resin precursor is a compound containing a functional group which can be reacted upon exposure to heat or an actinic radiation (for example, ultraviolet light or electron beams) or the like, and various curable compounds, which can be cured or crosslinked upon exposure to heat, an actinic radiation or the like to form a resin (particularly a cured or crosslinked resin), can be used. Examples of such resin precursors include heat curing compounds or resins [low-molecular weight compounds containing epoxy groups, polymerizable groups, isocyanate groups, alkoxysilyl groups, silanol groups or the like (for example, epoxy resins, unsaturated polyester resins, urethane resins, or silicone resins)], and photocuring compounds curable upon exposure to an actinic radiation (for example, ultraviolet light) (for example, ultraviolet light curing compounds such as photocuring monomers and oligomers). The photocuring compound may be, for example, an EB (electron beam) curing compound. Photocuring compounds such as photocuring monomers, oligomers, and photocuring resins which may have a low-molecular weight, are sometimes referred to simply as "photocuring resin."

Photocuring compounds include, for example, monomers and oligomers (or resins, particularly low-molecular weight resins). Monomers include, for example, monofunctional monomers [for example, (meth)acrylic monomers such as (meth)acrylic esters, vinyl monomers such as vinylpyrrolidone, and crosslinked ring-type hydrocarbon group-containing (meth)acrylates such as isobornyl(meth)acrylate or adamantyl(meth)acrylate], polyfunctional monomers containing at least two polymerizable unsaturated bonds [for example, alkylene glycol di(meth)acrylates such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylates such as diethylene glycol di(meth)acrylate, dipropylene glycol di(meth)acrylate, and polyoxytetramethylene glycol di(meth)acrylate; crosslinked ring-type hydrocarbon group-containing di(meth)acrylates such as tricyclodecane dimethanol di(meth)acrylate and adamantane di(meth)acrylate; and polyfunctional monomers containing about three to six polymerizable unsaturated bonds such as trimethylolpropane tri(meth)acrylate, trimethylolethane tri(meth)acrylate, pentaerythritol tri(meth)acrylate, pentaerythritol tetra(meth)acrylate, and dipentaerythritol penta(meth)acrylate].

Oligomers or resins include (meth)acrylate or epoxy (meth)acrylate of bisphenol A-alkylene oxide adducts (for example, bisphenol A-type epoxy(meth)acrylate and novolak-type epoxy(meth)acrylate), polyester(meth)acrylates (for example, aliphatic polyester-type (meth)acrylate and aromatic polyester-type (meth)acrylate), (poly)urethane (meth)acrylates (for example, polyester-type urethane(meth) acrylate, polyether-type urethane(meth)acrylate), and silicone(meth)acrylate. These photocuring compounds are usable either solely or in a combination of two or more.

Preferred curable resin precursors include photocuring compounds curable in a short time, for example, ultraviolet light curing compounds (for example, monomers, oligomers and resins which may have a low-molecular weight), and EB curing compounds. Resin precursors which are particularly advantageous from the practical viewpoint are ultraviolet light curing resins. From the viewpoint of improving resistance such as scratch resistance, preferably, the photocuring resin is a compound having in its molecule two or more (preferably approximately 2 to 6, more preferably 2 to 4) polymerizable unsaturated bonds. The molecular weight of the curable resin precursor is approximately not more than 5000, preferably not more than 2000, more preferably not more than 1000, from the viewpoint of compatibility with the polymer.

The curable resin precursor may contain a curing agent depending upon the type of the curable resin precursor. For example, in the case of heat curing resins, curing agents such as amines or polycarboxylic acids may be contained, and, in the case of photocuring resins, photopolymerization initiators may be contained. Examples of photopolymerization initiators include commonly used components, for example, acetophenones or propiophenone, benzyls, benzoins, benzophenones, thioxanthones, and acylphosphine oxides. The content of the curing agent such as a photocuring agent is approximately 0.1 to 20 parts by weight, preferably 0.5 to 10 parts by weight, more preferably 1 to 8 parts by weight (particularly 1 to 5 parts by weight), based on 100 parts by weight of the curable resin precursor and may be approximately 3 to 8 parts by weight.

The curable resin precursor may contain a curing accelerator. For example, the photocuring resin may contain photocuring accelerators, for example, tertiary amines (for example, dialkylaminobenzoic esters) and phosphine photopolymerization accelerators.

Specific Combination of Polymer with Curable Resin Precursor

At least two components in at least one polymer and at least one curable resin precursor may be used in a combination of materials which are mutually phase separated at a temperature around the processing temperature. Examples of such combinations include (a) a combination of a plurality of polymers which are mutually incompatible and phase separated, (b) a combination of a polymer and a curable resin precursor which are mutually incompatible and phase separated, and (c) a combination of a plurality of curable resin precursors which are mutually incompatible and phase separated.

Among these combinations, (a) a combination of a plurality of polymers and (b) a combination of a polymer with a curable resin precursor are generally preferred, and particularly (a) a combination of a plurality of polymers is preferred. When the compatibility of both the materials to be phase separated is low, both the materials are effectively phase separated in the course of drying for evaporating the solvent and the function as an anti-dazzling layer can be improved.

The thermoplastic resin and the curable resin precursor (or curing resin) are generally incompatible with each other. When the polymer and the curable resin precursor are incompatible with each other and phase separated, a plurality of polymers may be used as the polymer. When a plurality of polymers are used, meeting the requirement that at least one polymer is incompatible with the resin precursor (or curing resin) suffices for contemplated results, and the other polymer(s) may be compatible with the resin precursor.

A combination of two mutually incompatible thermoplastic resins with a curing compound (particularly a monomer or oligomer containing a plurality of curable functional groups) may be adopted. From the viewpoint of scratch resistance after curing, one polymer (particularly both polymers) in the incompatible thermoplastic resins may be a thermoplastic resin containing a functional group involved in the curing reaction (a functional group involved in curing of the curable resin precursor).

When a combination of a plurality of mutually incompatible polymers is adopted for phase separation, the curable resin precursor to be used in combination with the plurality of mutually incompatible polymers is compatible with at least one polymer in the plurality of incompatible polymers at a temperature around the processing temperature. Specifically, for example, when the plurality of mutually incompatible polymers are constituted by the first resin and the second resin, the curable resin precursor may be one which is compatible with at least one of the first resin and the second resin, preferably is compatible with both the polymer components. When the curable resin precursor is compatible with both the polymer components, phase separation occurs into at least two phases, i.e., a mixture composed mainly of a first resin and a curable resin precursor and a mixture composed mainly of a second resin and a curable resin precursor.

When the compatibility of a plurality of selected polymers is low, the polymers are effectively phase separated from each other in the course of drying for evaporating the solvent and the function as an anti-dazzling layer is improved. The phase separability of the plurality of polymers can be simply determined by a method in which a homogeneous solution is prepared using a good solvent for both the components and the solvent is gradually evaporated to visually inspect whether or not the residual solid matter is opaque in the course of evaporation.

In general, the polymer and the cured or crosslinked resin produced by curing of the resin precursor are different from each other in refractive index. Further, the plurality of polymers (first and second resins) are also different from each other in refractive index. The difference in refractive index between the polymer and the cured or crosslinked resin, and the difference in refractive index between the plurality of polymers (first and second resins) may be, for example, approximately 0.001 to 0.2, preferably 0.05 to 0.15.

The weight ratio between the polymer and the curable resin precursor is not particularly limited and may be selected, for example, from a range of polymer/curable resin precursor=approximately 5/95 to 95/5, and, from the viewpoint of surface hardness, is preferably polymer/curable resin precursor=approximately 5/95 to 60/40, more preferably 10/90 to 50/50, particularly preferably 10/90 to 40/60.

Solvent

The solvent may be selected and used according to the type and solubility of the polymer and curable resin precursor. A solvent capable of homogeneously dissolving at least the solid matter (a plurality of polymers and curable resin precursor, a reaction initiator, and other additives) suffices for contemplated results and may be used in wet spinodal decomposition. Examples of such solvents include ketones (for example, acetone, methyl ethyl ketone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene and xylene), halo carbon (for example, dichloromethane and dichloroethane), esters (for example, methyl acetate, ethyl acetate and butyl acetate), water, alcohols (for example, ethanol, isopropanol, butanol, and cyclohexanol), cellosolves (for example, methylcellosolve and ethylcellosolve), cellosolve acetates, sulfoxides (for example, dimethylsulfoxide), and amides (for example, dimethylformamide and dimethylacetamide). A mixture solvents composed of two or more of these solvents may be used.

The concentration of the solute (polymer and curable resin precursor, reaction initiator, and other additives) in the composition for an anti-dazzling layer may be selected from such a range that causes phase separation and such a range that castability, coatability and the like are not deteriorated. The solute concentration is, for example, approximately 1 to 80% by weight, preferably 5 to 60% by weight, more preferably 15 to 40% by weight (particularly 20 to 40% by weight).

Penetrating Solvent

In a preferred embodiment of the present invention, in order to render the interface between the light transparent base material and the anti-dazzling layer absent, preferably, the anti-dazzling layer is formed using a composition for an anti-dazzling layer, which is penetrable into the light transparent base material. The details of the penetrating solvent may be the same as those described above in "1) Anti-dazzling layer formed using composition for anti-dazzling layer comprising fine particles added to resin."

Method for Anti-Dazzling Layer Formation

The anti-dazzling layer may be formed using a composition for an anti-dazzling layer, comprising at least one polymer and at least one curable resin precursor. The use of a composition for an anti-dazzling layer prepared by mixing at least one polymer and at least one curable resin precursor with, if necessary, a penetrating solvent, and a suitable solvent is advantageous in that at least an anti-dazzling layer can be formed by forming a phase separated structure by spinodal decomposition from a liquid phase and curing the curable resin precursor.

The spinodal decomposition from the liquid phase can be carried out by evaporating the solvent from an anti-dazzling composition containing a material for phase separated structure formation and a proper solvent. The combination of materials which can form a phase separated structure may be, for example, a combination of a plurality of polymers, a combination of a polymer and a curable resin precursor, or a combination of a plurality of curable resin precursors. In a this method, an anti-dazzling layer may be formed by subjecting a composition comprising a thermoplastic resin, a photocuring compound (for example, a photopolymerizable monomer or oligomer), a photopolymerization initiator, and a solvent capable of dissolving the thermoplastic resin and photocuring compound (a common solvent) to spinodal decomposition to form a phase separated structure and exposing the product to light. Alternatively, the anti-dazzling layer may be formed by subjecting a composition comprising a thermoplastic resin, a resin incompatible with the thermoplastic resin and containing a photocurable group, a photocuring compound, a photopolymerization initiator, and a solvent capable of dissolving the resin and the photocuring compound to spinodal decomposition to form a phase separated structure, and applying light to the assembly. In these methods, at least one anti-dazzling layer may be formed on a light transparent base material.

Specific Formation Method

The anti-dazzling layer may be formed by a process comprising the steps of: mixing at least one polymer and at least one curable resin precursor using a proper solvent to prepare a composition for an anti-dazzling layer, applying the composition for an anti-dazzling layer onto a light transparent base material and then subjecting the coating to spinodal decomposition involving the evaporation of the solvent to form a phase separated structure; and curing the curable resin precursor to form at least an anti-dazzling layer. The phase separation step generally comprises the step of coating or casting a mixed liquid containing a polymer, a curable resin precursor, and a solvent (particularly a liquid composition such as a homogeneous solution) onto the surface of a light transparent base material and the step of evaporating the solvent from the coating layer or casting layer to form a phase separated structure having a regular or periodical average phase-to-phase distance. The anti-dazzling layer can be formed by curing the curable resin precursor.

In a preferred embodiment of the present invention, the mixed liquid may be a composition for an anti-dazzling layer, comprising a thermoplastic resin, a photocuring compound, a photopolymerization initiator, and a solvent capable of dissolving the thermoplastic resin and photocuring compound. The anti-dazzling layer is formed by applying light to photocurable components in the phase separated structure formed by the spinodal decomposition to cure the photocurable components. In another preferred embodiment of the present invention, the mixed liquid may be a composition for an anti-dazzling layer, comprising a plurality of mutually incompatible polymers, a photocuring compound, a photopolymerization initiator, and a solvent. In this case, the anti-dazzling layer is formed by applying light to photocurable components in the phase separated structure formed by the spinodal decomposition to cure the photocurable components.

The spinodal decomposition involving the evaporation of the solvent can impart regularity or periodicity to the average distance between domains in the phase separated structure. The phase separated structure formed by the spinodal decomposition can be immediately fixed by curing the curable resin precursor. The curable resin precursor can be cured, for example, by heating or light irradiation or a combination of these methods according to the type of the curable resin precursor. The heating temperature can be selected from a suitable temperature range, for example, from a range of approximately 50 to 150° C., so far as the phase separated structure is present, and may be selected from the same temperature range as in the phase separation step.

The anti-dazzling layer constituting a part of the optical laminate is provided by forming a phase separated structure in the anti-dazzling layer by spinodal decomposition (wet spinodal decomposition) from a liquid phase. Specifically, a composition for an anti-dazzling layer according to the present invention, comprising a polymer, a curable resin precursor, and a solvent is provided. The solvent is evaporated or removed from the composition for an anti-dazzling layer in its liquid phase (or a homogeneous solution or coating layer thereof) by drying or the like. In the course of drying or the like, an increase in concentration causes phase separation by spinodal decomposition to form a phase separated structure having a relatively regular phase-to-phase distance. More specifically, the wet spinodal decomposition is generally carried out by coating a composition for an anti-dazzling layer (preferably a homogeneous solution) comprising at least one polymer, at least one curable resin precursor, and a solvent onto a support and evaporating the solvent from the coating layer.

In the present invention, in the spinodal decomposition, as the phase separation proceeds, a co-continuous phase structure is formed. As the phase separation further proceeds, the continuous phase is rendered discontinuous by the surface tension of the phase per se to form a liquid droplet phase structure (a sea-island structure of spherical, truly spherical, disk-like, elliptical or other independent phases). Accordingly, depending upon the degree of the phase separation, a structure intermediate between a co-continuous phase structure and a liquid droplet phase structure (a phase structure in the course of transfer from the co-continuous phase to the liquid droplet phase) can also be formed. The phase separated structure of the anti-dazzling layer according to the present invention may be a sea-island structure (a liquid droplet phase structure or a phase structure in which one of the phases is independent or isolated), a co-continuous phase structure (or a network structure), or an intermediate structure in which a co-continuous phase structure and a liquid droplet phase structure exist together. By virtue of the phase separated structure, after the removal of the solvent by drying, fine concavoconvexes can be formed on the surface of the anti-dazzling layer.

In the phase separated structure, concavoconvexes are formed on the surface of the anti-dazzling layer, and, from the viewpoint of enhancing the surface hardness, a liquid droplet phase structure having at least island domains is advantageous. When the phase separated structure composed of the polymer and the precursor (or curable resin) is a sea-island structure, the polymer component may constitute a sea phase. From the viewpoint of the surface hardness, however, the polymer component preferably constitutes island domains. The formation of island domains leads to the formation of a concavoconvex shape having desired optical characteristics on the surface of the anti-dazzling layer after drying.

The average distance between domains in the phase separated structure is generally substantially regular or periodical and corresponds to the surface roughness Sm. The average distance between domains is, for example, not less than 60 μm and not more than 500 μm. Preferably, the lower limit of the average distance between domains is 100 μm, and the upper limit of the average distance between domains is about 450 μm. The average distance between domains in the phase separated structure may be regulated, for example, by properly selecting a combination of resins (particularly the selection of resins based on a solubility parameter). The distance between profile irregularities of the surface of the final optical laminate can be brought to a desired value by regulating the average distance between domains.

Except for the above matter, the anti-dazzling layer may be the same as those described above in "1) Anti-dazzling layer formed using composition for anti-dazzling layer comprising fine particles added to resin."

2. Surface Modifying Layer

In the present invention, in order to form an anti-dazzling layer, a substrate concavoconvex layer may be formed on a base material followed by the formation of a surface modifying layer on the substrate concavoconvex layer. The surface modifying layer consists of only the resin material described above in connection with the anti-dazzling layer, or a composition comprising the resin material and a surface modifying agent added to the resin material. In the surface modifying layer, fine concavoconvexes present along the concavoconvex shape of the substrate concavoconvex layer on the scale of one-tenth or less of the concavo-convex scale (profile peak height of concavoconvexes and spacing between profile peaks) in the surface roughness in the concavoconvex shape of the substrate concavoconvex layer can be sealed for flattening to form smooth concavoconvexes, or the spacing between profile peaks of the concavoconvexes and profile peak height, and the frequency (number) of the profile peaks can be regulated. The surface modifying layer is formed for surface modification purposes, for example, for imparting antistatic properties, refractive index regulation, hardness enhancement, and contamination preventive properties.

The thickness (on a cured state bases) of the surface modifying layer is not less than 0.6 μm and not more than 20 μm. Preferably, the lower limit of the thickness of the surface modifying layer is 1 μm, and the upper limit of the thickness of the surface modifying layer is 10 μm.

Surface Modifying Agent

One material or a mixture of two or more materials selected from the group consisting of antistatic agents, refractive index regulating agents, contamination preventive agents, water repellents, oil repellents, fingerprint adhesion preventive agents, hardness enhancing agents, and hardness regulating agents (cushioning property imparting agents) may be mentioned as the surface modifying agent.

Antistatic Agent (Electroconductive Agent)

The presence of an antistatic agent in the surface modifying layer can effectively prevent dust adherence to the surface of the optical laminate. Specific examples of antistatic agents may be the same as materials described above in "1) Anti-dazzling layer formed using composition for anti-dazzling layer comprising fine particles added to resin."

Refractive Index Regulating Agent

The refractive index regulating agent may be added to the surface modifying layer to regulate the optical properties of the optical laminate. Examples of such refractive index regulating agents include low-refractive index agents, medium-refractive index agents, and high-refractive index agents.

1) Low-Refractive Index Agent

The refractive index of the surface modifying layer to which the low-refractive index agent has been added is lower than that of the anti-dazzling layer. In a preferred embodiment of the present invention, the refractive index of the surface modifying layer to which the low-refractive index agent has been added is less than 1.5, preferably not more than 1.45. When the refractive index falls within the above-defined range, advantageously, the physical properties such as hardness and scratch resistance of the surface modifying layer are not lowered.

Regarding the materials for the surface modifying layer, the mixing ratio between the resin component and the low-refractive index agent is preferably resin component/low-refractive index agent=approximately 30/70 to 95/5.

Preferred low-refractive index agents include low-refractive index inorganic ultrafine particles such as silica and magnesium fluoride (all types of fine particles such as porous and hollow fine particles), and fluororesins which are low-refractive index resins. Polymerizable compounds containing a fluorine atom at least in their molecule, or polymers thereof are usable as the fluororesin. The polymerizable compound is not particularly limited. However, for example, those containing a curing reactive group such as a functional group curable by an ionizing radiation or a heat curable polar group are preferred. Further, compounds simultaneously having these reactive groups are also possible. Unlike the polymerizable compounds, the polymer does not have the above reactive groups at all.

Ethylenically unsaturated bond-containing fluorine-containing monomers are extensively usable as the polymerizable compound having an ionizing radiation curing group. More specific examples thereof include fluoroolefins (for example, fluoroethylene, vinylidene fluoride, tetrafluoroethylene, hexafluoropropylene, perfluorobutadiene, and perfluoro-2,2-dimethyl-1,3-dioxol). Specific examples of (meth) acryloyloxy group-containing compounds include (meth) acrylate compounds having a fluorine atom in their molecule such as 2,2,2-trifluoroethyl(meth)acrylate, 2,2,3,3,3-pentafluoropropyl(meth)acrylate, 2-(perfluorobutyl)ethyl(meth) acrylate, 2-(perfluorohexyl)ethyl(meth)acrylate, 2-(perfluorooctyl)ethyl(meth)acrylate, 2-(perfluorodecyl)ethyl(meth) acrylate, methyl α-trifluoromethacrylate, and ethyl α-trifluoromethacrylate; and fluorine-containing polyfunctional(meth)acrylic ester compounds containing a fluoroalkyl, fluorocycloalkyl, or fluoroalkylene group which contains at least three fluorine atoms and has 1 to 14 carbon atoms and at least two (meth)acryloyloxy groups in their molecule.

Preferred heat curing polar groups include, for example, hydrogen bond forming groups such as hydroxyl, carboxyl, amino, and epoxy groups. These groups are excellent in adhesion to the coating film, as well as in affinity for inorganic ultrafine particles such as silica. Heat curing polar group-containing polymerizable compounds include, for example, 4-fluoroethylene-perfluoroalkyl vinyl ether copolymers; fluoroethylene-hydrocarbon-type vinyl ether copolymers; and fluorine modification products of resins such as epoxy resins, polyurethane resins, cellulose resins, phenolic resins, and polyimide resins.

Examples of polymerizable compounds containing both an ionizing radiation curing group and a heat curing polar group include partially and fully fluorinated alkyl, alkenyl, and aryl esters of acrylic or methacrylic acid, fully or partially fluorinated vinyl ethers, fully or partially fluorinated vinyl esters, and fully or partially fluorinated vinyl ketones.

Specific examples of fluoropolymers include polymers of a monomer or monomer mixture containing at least one of fluorine-containing (meth)acrylate compounds of the above ionizing radiation curing group-containing polymerizable compounds; copolymers of at least one of the above fluorine-containing (meth)acrylate compounds with (meth)acrylate compounds not containing a fluorine atom in their molecule, for example, methyl(meth)acrylate, ethyl(meth)acrylate, propyl(meth)acrylate, butyl(meth)acrylate, and 2-ethylhexyl (meth)acrylate; and homopolymers or copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene.

Silicone-containing vinylidene fluoride copolymers which are copolymers comprising a silicone component incorporated into the above copolymers may also be used. Silicone components include (poly)dimethylsiloxanes, (poly)diethylsiloxanes, (poly)diphenylsiloxanes, (poly)methyphenylsiloxanes, alkyl-modified (poly)dimethylsiloxanes, azo group-containing (poly)dimethylsiloxanes, dimethyl silicones, phenylmethyl silicones, alkyl/aralkyl-modified silicones, fluorosilicones, polyether-modified silicones, fatty acid ester-modified silicones, methyl hydrogen silicones, silanol group-containing silicones, alkoxy group-containing silicones, phenol group-containing silicones, methacryl-modified silicones, acryl-modified silicones, amino-modified silicones, carboxylic acid-modified silicones, carbinol-modified silicones, epoxy-modified silicones, mercapto-modified silicones, fluorine-modified silicones, and polyether-modified silicones. Among others, those having a dimethylsiloxane structure are preferred.

Nonpolymers or polymers of the following compounds are also usable as the fluororesin. Specific examples thereof include compounds produced by reacting a fluorine-containing compound containing at least one isocyanate group in the molecule thereof with a compound containing in its molecule at least one functional group reactive with the isocyanate group, for example, an amino group, a hydroxyl group, or a carboxyl group; and compounds produced by reacting a fluorine-containing polyol such as a fluorine-containing polyether polyol, a fluorine-containing alkyl polyol, a fluorine-containing polyester polyol, or a fluorine-containing ∈-caprolactone-modified polyol with an isocyanate group-containing compound.

Further, the above fluorine atom-containing polymerizable compound and polymer may be used as a mixture with each resin component as described above in connection with the anti-dazzling layer. Furthermore, curing agents for curing reactive groups and the like and various additives and solvents for improving coatability or imparting contamination preventive properties may be properly used.

In a preferred embodiment of the present invention, the utilization of "void-containing fine particles" as a low-refractive index agent is preferred. "Void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles prepared by a technique disclosed in Japanese Patent Laid-Open No. 233611/2001. Other examples thereof include silica fine particles produced by a process described, for example, in Japanese Patent Laid-Open No. 133105/1995, No. 79616/2002, and No. 106714/ 2006. The void-containing silica fine particles can easily produced. Further, the hardness of the void-containing silica fine particles is high. Therefore, when a surface modifying layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the surface modifying layer.

2) High-Refractive Index Agent/Medium-Refractive Index Agent

The high-refractive index agent and the medium-refractive index agent may be added to the surface modifying layer to further improve antireflective properties. The refractive index of the high-refractive index agent and medium-refractive index agent may be set in a range of 1.55 to 2.00. The medium-refractive index agent has a refractive index in the range of 1.55 to 1.80, and the refractive index of the high-refractive index agent is in the range of 1.65 to 2.00.

These refractive index agents include fine particles, and specific examples thereof (the numerical value within the parentheses being a refractive index) include zinc oxide (1.90), titania (2.3 to 2.7), ceria (1.95), tin-doped indium oxide (1.95), antimony-doped tin oxide (1.80), yttria (1.87), and zirconia (2.0).

Leveling Agent

A leveling agent may be added to the surface modifying layer. Preferred leveling agents include fluorine-type or silicone-type leveling agents. The surface modifying layer to which the leveling agent has been added can realize a good coated face, can impart slipperiness and contamination preventive properties to the coating film surface in coating or drying, and can impart scratch resistance.

Contamination Preventive Agent

A contamination preventive agent may be added to the surface modifying layer. The contamination preventive agent is mainly used to prevent the contamination of the outermost surface of the optical laminate and can impart scratch resistance to the optical laminate. Specific examples of effective contamination preventive agents include additives which can develop water repellency, oil repellency, and fingerprint wiping-off properties. More specific examples of contamination preventive agents include fluorocompounds and silicon compounds or mixtures of these compounds. More specific examples thereof include fluoroalkyl group-containing silane coupling agents such as 2-perfluorooctylethyltriaminosilane. Among them, amino group-containing compounds are particularly preferred.

Resin

The surface modifying layer may comprise at least a surface modifying agent and a resin. When the surface modifying layer does not contain a surface modifying agent, the resin functions as a hardness enhancing agent or as a hardness regulating agent (a cushioning property imparting agent) or functions to seal fine concavoconvexes present in the substrate concavoconvex layer to render the concavoconvex surface smooth and gentle. The resin is preferably transparent, and specific examples thereof are classified into three resins, that is, ionizing radiation curing resins which are curable upon exposure to ultraviolet light or electron beams, mixtures of ionizing radiation curing resins with solvent drying-type resins (resins which can be brought to a film by merely removing, by drying, a solvent for regulating the solid content in coating, for example, thermoplastic resin), and heat curing resins. Preferred are ionizing radiation curing resins.

Specific examples of ionizing radiation curing resins may be the same as materials described above in "1) Anti-dazzling layer formed using composition for anti-dazzling layer comprising fine particles added to resin." The solvent drying-type resin used as a mixture with the ionizing radiation curing resin may be the same as materials described above in "1) Anti-dazzling layer formed using composition for anti-dazzling layer comprising fine particles added to resin." Specific examples of heat curing resin may be the same as materials described above in "1) Anti-dazzling layer formed using composition for anti-dazzling layer comprising fine particles added to resin."

In a preferred embodiment of the present invention, the surface modifying layer may contain organic fine particles and inorganic fine particles (fluidity modifier C) for regulating the fluidity. Preferred fine particles are colloidal silica. An attempt to form a surface modifying layer to seal fine concavoconvexes for smoothing sometimes causes a significant lowering in anti-dazzling properties due to excessive smoothing. The formation of a film using the colloidal silica-containing composition can simultaneously realize both anti-dazzling properties and black color reproduction. The function by which such effect can be attained has not been fully elucidated yet but is believed to be as follows. The colloidal silica-containing composition, when the fluidity is regulated, can be rendered highly conformable to the concavoconvex shape of the surface. Accordingly, upon smoothing, while imparting proper smoothness to fine concavoconvexes in the substrate concavoconvex layer which are completely collapsed in the conventional surface modifying layer, a certain level of concavoconvexes can be allowed to stay.

The term "colloidal silica" as used herein means a colloidal solution containing silica particles in a colloid state dispersed in water or an organic solvent. The particle diameter (diameter) of the colloidal silica is preferably approximately 1 to 50 nm which is on an ultrafine particle size level. The particle diameter of the colloidal silica in the present invention is the average particle diameter as measured by a BET method. The average particle diameter is specifically determined by measuring the surface area by the BET method and calculating the average particle diameter based on the assumption that the particles are truly spherical.

The colloidal silica is known, and commercially available products thereof include, for example, "methanol silica sol," "MA-ST-M," "IPA-ST," "EG-ST," "EG-ST-ZL," "NPC-ST," "DMAC-ST," "MEK," "XBA-ST," and "MIBK-ST" (all of which are tradenames of products manufactured by Nissan Chemical Industries Ltd.), "OSCAL1132," "OSCAL1232," "OSCAL1332," "OSCAL1432," "OSCAL1532," "OSCAL1632," and "OSCAL1132" (all of which are tradenames of products manufactured by Catalysts and Chemicals Industries Co., Ltd.).

The content of the organic fine particles or inorganic fine particles is preferably 5 to 300 in terms of the mass of the fine particles based on 100 of the mass of the binder resin in the surface modifying layer (mass of fine particles/mass of binder resin=P/V ratio=5 to 300/100). When the addition amount falls within the above-defined range, the conformability to the concavoconvex shape is satisfactory. As a result, black color reproduction such as glossy black color feeling and anti-dazzling properties can be simultaneously realized. Further, properties such as adhesion and scratch resistance are improved. The addition amount may vary depending upon the fine particles added. For example, in the case of colloidal silica, the addition amount is preferably 5 to 80. When the addition amount falls within the above-defined range, the anti-dazzling properties and the adhesion to other layer(s) are improved.

Solvent

A composition for a surface modifying layer comprising the above components mixed with the solvent is utilized for surface modifying layer formation. The solvent may be selected and used depending upon the type and solubility of the polymer and the curable resin precursor, and any solvent may be used so far as it can homogeneously dissolve at least solid matter (a plurality of polymers and curable resin precursor, a reaction initiator, and other additives). Such solvents include, for example, ketones, for example, acetone, methyl ethyl ketone, methyl isobutyl ketone, and cyclohexanone; ethers, for example, dioxane and tetrahydrofuran; aliphatic hydrocarbons, for example, hexane; alicyclic hydrocarbons, for example, cyclohexane; aromatic hydrocarbons, for example, toluene and xylene; halo carbon, for example, dichloromethane and dichloroethane; esters, for example, methyl acetate, ethyl acetate, and butyl acetate; water; alcohols, for example, ethanol, isopropanol, butanol, and cyclohexanol; cellosolves, for example, methylcellosolve and ethylcellosolve; cellosolve acetates; sulfoxides, for example, dimethylsulfoxide; and amides, for example, dimethylformamide and dimethylacetamide. A mixture solvent composed of two or more of these solvents may also be used. Preferred are ketones and esters.

Method for Surface Modifying Layer Formation

The surface modifying layer may be formed by applying a composition for a surface modifying layer onto the substrate concavoconvex layer. The composition for a surface modifying layer may be formed by coating methods such as roll coating, Mayer bar coating, or gravure coating. After coating of the composition for a surface modifying layer, the coating is dried and cured by ultraviolet light irradiation. Specific examples of ultraviolet light sources include ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators.

3. Optional Layers

The optical laminate according to the present invention comprises a light transparent base material and an anti-dazzling layer (or a concavoconvex substrate layer and a surface modifying layer). Optional layers such as an antistatic layer, a low-refractive index layer, and a contamination preventive layer may be further provided. The low-refractive index layer preferably has a lower refractive index than the refractive index of the anti-dazzling layer having a single layer structure or surface modifying layer. The refractive index of the low-refractive index layer is not more than 1.45, particularly preferably not more than 1.42. The thickness of the low-refractive index layer is not limited and may be generally properly selected from a range of approximately 30 nm to 1 µm. The antistatic layer, low-refractive index layer, and contamination preventive layer may be formed by using a composition prepared by mixing a resin and the like with an antistatic agent, a low-refractive index agent, a contamination preventive agent or the like as described above in connection with the surface modifying layer. Accordingly, the antistatic agent, low-refractive index agent, contamination preventive agent, resin and the like may be the same as those used in the formation of the surface modifying layer.

4. Light Transparent Base Material

The light transparent base material is preferably smooth and possesses excellent heat resistance and mechanical strength. Specific examples of materials usable for the light transparent base material formation include thermoplastic resins, for example, polyesters (for example, polyethylene terephthalate and polyethylene naphthalate), cellulosic resins (for example, cellulose triacetate, cellulose diacetate, and cellulose acetate butyrate), polyethersulfone, and polyolefins (for example, polysulfone, polypropylene, and polymethylpentene), polyvinyl chloride, polyvinylacetal, polyether ketone, acrylic resins (for example, polymethyl methacrylate), polycarbonate, and polyurethane. Preferred are polyesters (polyethylene terephthalate and polyethylene naphthalate) and cellulose triacetate. Films of amorphous olefin polymers (cycloolefin polymers: COPs) having an alicyclic structure may also be mentioned as other examples of the light transparent base material. These films are base materials using norbornene polymers, monocyclic olefinic polymers, cyclic conjugated diene polymers, vinyl alicyclic hydrocarbon polymer resins and the like, and examples thereof include Zeonex and ZEONOR (norbornene resins), manufactured by Zeon Corporation, Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optlet OZ-1000 series (alicyclic acrylic resins) manufactured by Hitachi Chemical Co., Ltd. Further, FV series (low birefringent index and low photoelastic films) manufactured by Asahi Kasei Chemicals Corporation are also preferred as base materials alternative to triacetylcellulose.

In the present invention, preferably, these thermoplastic resins are used as a highly flexible thin film. Depending upon the form of use where curability are required, plate-like materials such as plates of these thermoplastic resins or glass plates are also usable.

The thickness of the light transparent base material is not less than 20 µm and not more than 300 µm. Preferably, the upper limit of the thickness is 200 µm, and the lower limit of the thickness is 30 µm. When the light transparent base material is a plate-like material, the thickness may be above the upper limit of the above-defined thickness range. In this case, a thickness of about 1 to 5 mm is adopted. In forming an anti-dazzling layer on the light transparent base material, the base material may be previously subjected to physical treatment such as corona discharge treatment or oxidation treatment or may be previously coated with an anchoring agent or a coating material known as a primer from the viewpoint of improving the adhesion.

III. Utilization of Optical Laminate

The optical laminate produced by the process according to the present invention may be used in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from the anti-dazzling layer faces the surface of the polarizing element. The polarizing element may comprise, for example, polyvinyl alcohol films, polyvinylformal films, polyvinylacetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

According to a further aspect of the present invention, there is provided an image display device. The optical laminate according to the present invention or the polarizing plate according to the present invention is provided on the surface of a display device. The image display device according to the present invention may be a non-spontaneous luminescent image display device (in which the display element per se does not emit light), for example, LCD, or a spontaneous luminescent image display device (in which the display element per se emits light), for example, PDP, FED, ELD (organic EL or inorganic EL), or CRT. The LCD which is a typical example of a non-spontaneous luminescent image display device may comprises a transmission display and a light source device for applying light to the transmission display from its backside. When the image display device according to the present invention is LCD, the optical laminate or polarizing plate according to the present invention is provided on the surface of the transmission display.

When the image display device according to the present invention is a liquid crystal display device, light emitted from the light source device is applied through the lower side of the optical laminate according to the present invention. In the liquid crystal display devices, a phase difference plate may be inserted into between the liquid crystal display element and the polarizing plate. If necessary, an adhesive layer may be provided between individual layers in the liquid crystal display device.

On the other hand, PDP, which is a spontaneous luminescent image display device, comprises a surface glass substrate having an electrode on its surface, a backside glass substrate opposed to the surface glass substrate, and a discharge gas sealed into between the surface glass substrate and the backside glass substrate. A construction may be adopted in which electrodes and very small grooves are provided on the surface of the backside glass substrate, and red, green and blue phosphor layers provided within the grooves. In this spontaneous luminescent image display device, a voltage is applied across the electrodes constituted by both the glass substrates to emit ultraviolet light which allows light to be emitted from the phosphors. When the image display device according to the present invention is PDP, the above optical laminate may be provided on the surface of the surface glass substrate or on its front plate (glass substrate or film substrate).

Other spontaneous luminescent image display devices include image display devices such as ELD devices and CRTs. In the ELD device comprises a luminophor (zinc sulfide or a diamine compound which emits light upon the application of voltage) vapor deposited on a glass substrate, and display is carried out while regulating the voltage applied to the substrate. In the CRT, electric signals are converted to light which produces an image perceived by the human's eye. In this case, the above optical laminate may be provided on the uppermost surface of the display device or the surface of the front plate of the display device.

All the above image display devices according to the present invention may be used for displays, for example, in televisions, computers, and word processors. Among others, the image display devices are preferably used on the surface of displays for high-definition images such as CRTs, liquid crystal panels, PDPs, ELDs, and FEDs.

EXAMPLES

The following embodiments further illustrate the present invention. However, it should be noted that the contents of the present invention are not limited by these embodiments. The "parts" and "%" are by mass unless otherwise specified. All of monodisperse fine particles incorporated in the following compositions are those having a particle size distribution of average particle diameter ±00.3 to ±1 μm. It could easily be understood that this particle size distribution is not applied to fine particles having a particle diameter of not more than 3.5 μm and fine particles having a broad fine particle distribution.

Compositions for respective layers constituting an optical laminate were prepared according to the following formulations.

Preparation of Composition for Anti-Dazzling Layer

| Composition 1 for anti-dazzling layer (Example 1) | |
|---|---|
| Ultraviolet curing resin: | |
| Pentaerythritol triacrylate (PETA) (refractive index 1.51) | 20 pts. mass |
| Cellulose acetate propionate (molecular weight 50,000) | 0.25 pt. mass |
| Photocuring initiator: | |
| Irgacure 184 (manufactured by Ciba Specialty Chemicals, K.K.) | 1.2 pts. mass |
| Irgacure 907 (manufactured by Ciba Specialty Chemicals, K.K.) | 0.2 pt. mass |
| Fine particles: | |
| Amorphous silica (avarage particle diameter 1.0 μm, surface hydrophobitized with silane coupling agent) | 1.24 pts. mass |

-continued

| Composition 1 for anti-dazzling layer (Example 1) | |
|---|---|
| Leveling agent: | |
| Silicone leveling agent | 0.013 pt. mass |
| Solvent: | |
| Toluene | 34.0 pts. mass |
| Methyl isobutyl ketone | 8.5 pts. mass |

The above materials were thoroughly mixed together to prepare a composition. This composition was filtered through a polypropylene filter having a pore diameter of 30 μm to prepare composition 1 for an anti-dazzling layer, having a solid content of 35%.

| Composition 2 for anti-dazzling layer (Example 4 and Comparative Example 1) | |
|---|---|
| Ultraviolet curing resin: | |
| Pentaerythritol triacrylate (PETA) (refractive index 1.51) | 20 pts. mass |
| Cellulose acetate propionate (molecular weight 50,000) | 0.4 pt. mass |
| Photocuring initiator: | |
| Irgacure 184 (manufactured by Ciba Specialty Chemicals, K.K.) | 1.2 pts. mass |
| Irgacure 907 (manufactured by Ciba Specialty Chemicals, K.K.) | 0.2 pt. mass |
| Fine particles: | |
| Amorphous silica (avarage particle diameter 1.5 μm) | 0.88 pt. mass |
| Leveling agent: | |
| Silicone leveling agent | 0.012 pt. mass |
| Solvent: | |
| Toluene | 35.4 pts. mass |
| Methyl isobutyl ketone | 6.7 pts. mass |

The above materials were thoroughly mixed together to prepare a composition. This composition was filtered through a polypropylene filter having a pore diameter of 30 μm to prepare composition 2 for an anti-dazzling layer, having a solid content of 35%.

| Composition 3 for anti-dazzling layer (Comparative Example 2) | |
|---|---|
| Ultraviolet curing resin: | |
| Pentaerythritol triacrylate (PETA) (refractive index 1.51) | 20 pts. mass |
| Cellulose acetate propionate (molecular weight 50,000) | 0.4 pt. mass |
| Photocuring initiator: | |
| Irgacure 184 (manufactured by Ciba Specialty Chemicals, K.K.) | 1.2 pts. mass |
| Irgacure 907 (manufactured by Ciba Specialty Chemicals, K.K.) | 0.2 pt. mass |
| Fine particles: | |
| Amorphous silica (avarage particle diameter 1.5 μm, surface hydrophobitized with silane coupling agent) | 0.46 pt. mass |

| Composition 3 for anti-dazzling layer (Comparative Example 2) | |
|---|---|
| Amorphous silica (avarage particle diameter 1.0 μm, surface hydrophobitized with silane coupling agent) | 0.46 pt. mass |
| Leveing agent: | |
| Silicone leveling agent | 0.012 pt. mass |
| Solvent: | |
| Toluene | 35.9 pts. mass |
| Methyl isobutyl ketone | 6.3 pts. mass |

The above materials were thoroughly mixed together to prepare a composition. This composition was filtered through a polypropylene filter having a pore diameter of 30 μm to prepare composition 3 for an anti-dazzling layer, having a solid content of 35%.

| Composition 4 for anti-dazzling layer (Example 8) | |
|---|---|
| Ultraviolet curing resin: | |
| Pentaerythritol triacrylate (PETA) (refractive index 1.51) | 38 pts. mass |
| Cellulose acetate propionate (molecular weight 50,000) | 0.86 pt. mass |
| Photocuring initiator: | |
| Irgacure 184 (manufactured by Ciba Specialty Chemicals, K.K.) | 1.97 pts. mass |
| Irgacure 907 (manufactured by Ciba Specialty Chemicals, K.K.) | 0.46 pt. mass |
| Fine particles: | |
| Amorphous silica (avarage particle diameter 1.4 μm, surface hydrophobitized with silane coupling agent) | 0.31 pt. mass |
| Amorphous silica (avarage particle diameter 1.9 μm, surface hydrophobitized with silane coupling agent) | 1.92 pts. mass |
| Leveling agent: | |
| Silicone leveling agent | 0.072 pt. mass |
| Solvent: | |
| Toluene | 55.2 pts. mass |
| Methyl isobutyl ketone | 14.1 pts. mass |

The above materials were thoroughly mixed together to prepare a composition. This composition was filtered through a polypropylene filter having a pore diameter of 30 μm to prepare composition 4 for an anti-dazzling layer, having a solid content of 38.5%.

| Composition 5 for anti-dazzling layer (Example 9) | |
|---|---|
| Ultraviolet curing resin: | |
| Pentaerythritol triacrylate (PETA) (refractive index 1.51) | 38 pts. mass |
| Cellulose acetate propionate (molecular weight 50,000) | 0.48 pt. mass |

| Composition 5 for anti-dazzling layer (Example 9) | |
|---|---|
| Photocuring initiator: | |
| Irgacure 184 (manufactured by Ciba Specialty Chemicals, K.K.) | 1.97 pts. mass |
| Irgacure 907 (manufactured by Ciba Specialty Chemicals, K.K.) | 0.46 pt. mass |
| Fine particles: | |
| Amorphous silica (avarage particle diameter 1.4 μm, surface hydrophobitized with silane coupling agent) | 0.31 pt. mass |
| Amorphous silica (avarage particle diameter 1.9 μm, surface hydrophobitized with silane coupling agent) | 1.92 pts. mass |
| Leveling agent: | |
| Silicone leveling agent | 0.072 pt. mass |
| Solvent: | |
| Toluene | 55.2 pts. mass |
| Methyl isobutyl ketone | 13.8 pts. mass |

The above materials were thoroughly mixed together to prepare a composition. This composition was filtered through a polypropylene filter having a pore diameter of 30 μm to prepare composition 5 for an anti-dazzling layer, having a solid content of 38.5%.

| Composition 6 for anti-dazzling layer (Example 10) | |
|---|---|
| Ultraviolet curing resin: | |
| Pentaerythritol triacrylate (PETA) (refractive index 1.51) | 38 pts. mass |
| Cellulose acetate propionate (molecular weight 50,000) | 0.47 pt. mass |
| Photocuring initiator: | |
| Irgacure 127 (manufactured by Ciba Specialty Chemicals, K.K.) | 1.98 pts. mass |
| Speedcure MBB (manufactured by LAMBSON Fine Chemicals) | 0.33 pt. mass |
| Fine particles: | |
| Amorphous silica (avarage particle diameter 1.4 μm, surface hydrophobitized with silane coupling agent) | 0.20 pt. mass |
| Amorphous silica (avarage particle diameter 1.9 μm, surface hydrophobitized with silane coupling agent) | 3.46 pts. mass |
| Leveling agent: | |
| Silicone leveling agent | 0.072 pt. mass |
| Solvent: | |
| Toluene | 57 pts. mass |
| Methyl isobutyl ketone | 14 pts. mass |

The above materials were thoroughly mixed together to prepare a composition. This composition was filtered through a polypropylene filter having a pore diameter of 30 μm to prepare composition 6 for an anti-dazzling layer, having a solid content of 38.5%.

| Composition 7 for anti-dazzling layer (Comparative Example 3) | |
|---|---|
| Ultraviolet curing resin: | |
| Pentaerythritol triacrylate (PETA) (refractive index 1.51) | 20 pts. mass |
| Cellulose acetate propionate (molecular weight 50,000) | 0.28 pt. mass |
| Photocuring initiator: | |
| Irgacure 184 (manufactured by Ciba Specialty Chemicals, K.K.) | 1.01 pts. mass |
| Irgacure 907 (manufactured by Ciba Specialty Chemicals, K.K.) | 0.28 pt. mass |
| Fine particles: | |
| Amorphous silica (avarage particle diameter 1.5 μm, surface hydrophobitized with silane coupling agent) | 1.8 pts. mass |
| Monodisperse styrene beads (particle diameter 3.5 μm, refractive index 1.60) | 0.23 pt. mass |
| Leveling agent: | |
| Silicone leveling agent | 0.024 pt. mass |
| Solvent: | |
| Toluene | 31 pts. mass |
| Methyl isobutyl ketone | 7 pts. mass |

The above materials were thoroughly mixed together to prepare a composition. This composition was filtered through a polypropylene filter having a pore diameter of 30 μm to prepare composition 7 for an anti-dazzling layer, having a solid content of 38.5%.

| Composition 8 for anti-dazzling layer (Comparative Example 4) | |
|---|---|
| Ultraviolet curing resin: | |
| Pentaerythritol triacrylate (PETA) (refractive index 1.51) | 20 pts. mass |
| Cellulose acetate propionate (molecular weight 50,000) | 0.28 pt. mass |
| Photocuring initiator: | |
| Irgacure 184 (manufactured by Ciba Specialty Chemicals, K.K.) | 1.01 pts. mass |
| Irgacure 907 (manufactured by Ciba Specialty Chemicals, K.K.) | 0.22 pt. mass |
| Fine particles: | |
| Amorphous silica (avarage particle diameter 1.4 μm, surface hydrophobitized with silane coupling agent) | 1.7 pts. mass |
| Amorphous silica (avarage particle diameter 1.9 μm, surface hydrophobitized with silane coupling agent) | 0.15 pt. mass |
| Monodisperse styrene beads (particle diameter 3.5 μm, refractive index 1.60) | 0.45 pt. mass |
| Leveling agent: | |
| Silicone leveling agent | 0.024 pt. mass |
| Solvent: | |
| Toluene | 31 pts. mass |
| Methyl isobutyl ketone | 7 pts. mass |

The above materials were thoroughly mixed together to prepare a composition. This composition was filtered through a polypropylene filter having a pore diameter of 30 μm to prepare composition 8 for an anti-dazzling layer, having a solid content of 38.5%.

Preparation of Composition for Substrate Concavoconvex Layer

| Composition 1 for substrate concavoconvex layer (Example 3) | |
|---|---|
| Ultraviolet curing resin: | |
| Pentaerythritol triacrylate (PETA) (refractive index 1.51) | 2.1 pts. mass |
| Dipentaerythritol hexaacrylate (DPHA) (refractive index 1.51) | 0.9 pt. mass |
| Polymethyl methacrylate (molecular weight 75,000) | 0.22 pt. mass |
| Photocuring initiator: | |
| Irgacure 184 (manufactured by Ciba Specialty Chemicals, K.K.) | 0.126 pt. mass |
| Irgacure 907 (manufactured by Ciba Specialty Chemicals, K.K.) | 0.021 pt. mass |
| First light transparent fine particles: | |
| Monodisperse acrylic beads (particle diameter 5 μm, refractive index 1.535) | 0.44 pt. mass |
| Second light transparent fine particles: | |
| Amorphous silica (average particle diameter 1.5 μm, particle surface hydrophobitized with organic material) | 0.044 pt. mass |
| Leveling agent: | |
| Silicone leveling agent | 0.011 pt. mass |

A mixed solvent composed of toluene and cyclohexanone at a mixing ratio of 8:2 was added to the above materials, and they were mixed thoroughly to prepare a composition having a solid content of 40.5%. This composition was filtered through a polypropylene filter having a pore diameter of 30 μm to prepare composition 1 for a substrate concavoconvex layer.

| Composition 2 for substrate concavoconvex layer (Example 6) | |
|---|---|
| Ultraviolet curing resin: | |
| Pentaerythritol triacrylate (PETA) (refractive index 1.51) | 2.20 pts. mass |
| Isocyanuric acid-modified diacrylate M215 (manufactured by Nippon Kayaku Co., Ltd., refractive index 1.51) | 1.21 pts. mass |
| Polymethyl methacrylate (molecular weight 75,000) | 0.34 pt. mass |
| Photocuring initiator: | |
| Irgacure 184 (manufactured by Ciba Specialty Chemicals, K.K.) | 0.22 pt. mass |
| Irgacure 907 (manufactured by Ciba Specialty Chemicals, K.K.) | 0.04 pt. mass |
| First light transparent fine particles: | |
| Monodisperse acrylic beads (particle diameter 9.5 μm, refractive index 1.535) | 0.82 pt. mass |

| Composition 2 for substrate concavoconvex layer (Example 6) | |
|---|---|
| Second light transparent fine particles: | |
| Amorphous silica ink (average particle diameter 1.5 μm, solid content 60%, silica component: 15% of the total solid content) | 1.73 pts. mass |
| Leveling agent: | |
| Silicone leveling agent | 0.02 pt. mass |
| Solvent: | |
| Toluene | 5.88 pts. mass |
| Cyclohexanone | 1.55 pts. mass |

The above materials were thoroughly mixed together to prepare a composition having a solid content of 40.5%. This composition was filtered through a polypropylene filter having a pore diameter of 30 μm to prepare composition 2 for a substrate concavoconvex layer.

| Composition 3 for substrate concavoconvex layer (Examples 5 and 7) | |
|---|---|
| Ultraviolet curing resin: | |
| Pentaerythritol triacrylate (PETA) (manufactured by Nippon Kayaku Co., Ltd., refractive index 1.51) | 100 pts. mass |
| Polymer: | |
| Polymethyl methacrylate (molecular weight 75,000) | 10 pts. mass |
| First light transparent fine particles: | |
| Monodisperse acrylic beads (particle diameter 7.0 μm, refractive index 1.535) | 20 pts. mass |
| Second light transparent fine particles: | |
| Monodisperse styrene beads (particle diameter 3.5 μm, refractive index 1.60) | 2.5 pts. mass |
| Third light transparent fine particles: | |
| Amorphous silica (average particle diameter 2.5 μm, particle surface hydrophobitized with organic material) | 2 pts. mass |
| Photocuring initiator: | |
| Irgacure 184 (manufactured by Ciba Specialty Chemicals, K.K.) | 6 pts. mass |
| Irgacure 907 (manufactured by Ciba Specialty Chemicals, K.K.) | 1 pt. mass |
| Leveling agent: | |
| Silicone leveling agent | 0.045 pt. mass |
| Solvent: | |
| Toluene | 158 pts. mass |
| Cyclohexanone | 39.5 pts. mass |

The above materials were thoroughly mixed together and the mixture was filtered through a polypropylene filter having a pore diameter of 30 μm to prepare composition 3 for a substrate concavoconvex layer having a solid content of 40.5%.

| Composition 4 for substrate concavoconvex layer (Example 2) | |
| --- | --- |
| Ultraviolet curing resin: | |
| Pentaerythritol triacrylate (PETA) (refractive index 1.51) | 100 pts. mass |
| Polymer: | |
| Polymethyl methacrylate (molecular weight 75,000) | 10 pts. mass |
| First light transparent fine particles: | |
| Monodisperse acrylic beads (particle diameter 7.0 μm, refractive index 1.535) | 20 pts. mass |
| Second light transparent fine particles: | |
| Monodisperse styrene beads (particle diameter 3.5 μm, refractive index 1.60) | 16.5 pts. mass |
| Third light transparent fine particles: | |
| Amorphous silica (average particle diameter 2.5 μm) | 2 pts. mass |
| Photocuring initiator: | |
| Irgacure 184 (manufactured by Ciba Specialty Chemicals, K.K.) | 6 pts. mass |
| Irgacure 907 (manufactured by Ciba Specialty Chemicals, K.K.) | 1 pt. mass |
| Leveling agent: | |
| Silicone leveling agent | 0.045 pt. mass |
| Solvent: | |
| Toluene | 174.4 pts. mass |
| Cyclohexanone | 43.6 pts. mass |

The above materials were thoroughly mixed together and the mixture was filtered through a polypropylene filter having a pore diameter of 30 μm to prepare composition 4 for anti-dazzling layer formation, having a solid content of 40.5%.

| Composition 5 for substrate concavoconvex layer (Comparative Example 1) | |
| --- | --- |
| Ultraviolet curing resin: | |
| Pentaerythritol triacrylate (PETA) (manufactured by Nippon Kayaku Co., Ltd., refractive index 1.51) | 100 pts. mass |
| Polymer: | |
| Polymethyl methacrylate (molecular weight 75,000) | 10 pts. mass |
| First light transparent fine particles: | |
| Monodisperse acrylic beads (particle diameter 7.0 μm, refractive index 1.535) | 20 pts. mass |
| Second light transparent fine particles: | |
| Monodisperse styrene beads (particle diameter 3.5 μm, refractive index 1.60) | 3.5 pts. mass |
| Third light transparent fine particles: | |
| Amorphous silica (average particle diameter 2.5 μm, particle surface hydrophobitized with organic material) | 2 pts. mass |
| Photocuring initiator: | |
| Irgacure 184 (manufactured by Ciba Specialty Chemicals, K.K.) | 6 pts. mass |
| Irgacure 907 (manufactured by Ciba Specialty Chemicals, K.K.) | 1 pt. mass |
| Leveling agent: | |
| Silicone leveling agent | 0.045 pt. mass |
| Solvent: | |
| Toluene | 158 pts. mass |
| Cyclohexanone | 39.5 pts. mass |

The above materials were thoroughly mixed together and the mixture was filtered through a polypropylene filter having a pore diameter of 30 μm to prepare composition 5 for a substrate concavoconvex layer having a solid content of 40.5%.

| Composition 6 for substrate concavoconvex layer (Comparative Example 5) | |
| --- | --- |
| Ultraviolet curing resin: | |
| Pentaerythritol triacrylate (PETA) (refractive index 1.51) | 20 pts. mass |
| Cellulose acetate propionate (molecular weight 50,000) | 0.28 pt. mass |
| Photocuring initiator: | |
| Irgacure 184 (manufactured by Ciba Specialty Chemicals, K.K.) | 1.01 pts. mass |
| Irgacure 907 (manufactured by Ciba Specialty Chemicals, K.K.) | 0.22 pt. mass |
| Fine particles: | |
| Monodisperse styrene beads (particle diameter 3.5 μm, refractive index 1.60) | 1.3 pts. mass |
| Leveling agent: | |
| Silicone leveling agent | 0.018 pt. mass |
| Solvent: | |
| Toluene | 30 pts. mass |
| Cyclohexanone | 12 pts. mass |

The above materials were thoroughly mixed together and the mixture was filtered through a polypropylene filter having a pore diameter of 30 μm to prepare composition 6 for a substrate concavoconvex layer having a solid content of 40.5%.

| Composition 7 for substrate concavoconvex layer (Comparative Example 6) | |
| --- | --- |
| Ultraviolet curing resin: | |
| Pentaerythritol triacrylate (PETA) (manufactured by Nippon Kayaku Co., Ltd., refractive index 1.51) | 100 pts. mass |

Composition 7 for substrate concavoconvex layer
(Comparative Example 6)

| | |
|---|---|
| Polymer: | |
| Polymethyl methacrylate (molecular weight 75,000) | 10 pts. mass |
| First light transparent fine particles: | |
| Monodisperse acrylic beads (particle diameter 7.0 μm, refractive index 1.535) | 20 pts. mass |
| Second light transparent fine particles: | |
| Monodisperse styrene beads (particle diameter 3.5 μm, refractive index 1.60) | 1.3 pts. mass |
| Third light transparent fine particles: | |
| Amorphous silica (average particle diameter 2.5 μm, particle surface hydrophobitized with organic material) | 2 pts. mass |
| Photocuring initiator: | |
| Irgacure 184 (manufactured by Ciba Specialty Chemicals, K.K.) | 6 pts. mass |
| Irgacure 907 (manufactured by Ciba Specialty Chemicals, K.K.) | 1 pt. mass |
| Leveling agent: | |
| Silicone leveling agent | 0.045 pt. mass |
| Solvent: | |
| Toluene | 158 pts. mass |
| Cyclohexanone | 39.5 pts. mass |

The above materials were thoroughly mixed together and the mixture was filtered through a polypropylene filter having a pore diameter of 30 μm to prepare composition 7 for a substrate concavoconvex layer having a solid content of 40.5%.

Preparation of Composition for Surface Modifying Layer

Composition 1 for surface modifying layer
(Example 6 and Comparative Example 6)

| | |
|---|---|
| Ultraviolet curing resin: | |
| Polyfunctional urethane acrylate UV1700B (manufactured by Nippon Synthetic Chemical Industry Co., Ltd., refractive index 1.51) | 31.1 pts. mass |
| Aronix M315 (manufactured by TOAGOSEI CO., LTD., triacrylate of 3-mole ethylene oxide adduct of isocyanuric acid) | 10.4 pts. mass |
| Photocuring initiator: | |
| Irgacure 184 (manufactured by Ciba Specialty Chemicals, K.K.) | 1.49 pts. mass |
| Irgacure 907 (manufactured by Ciba Specialty Chemicals, K.K.) | 0.41 pt. mass |
| Contamination preventive agent: | |
| UT-3971 (manufactured by Nippon Synthetic Chemical Industry Co., Ltd.) | 2.07 pts. mass |
| Solvent: | |
| Toluene | 525.18 pts. mass |
| Cyclohexanone | 60.28 pts. mass |

The above components were thoroughly mixed together, and the mixture was filtered through a polypropylene filter having a pore diameter of 10 μm to prepare composition 1 for a surface modifying layer, having a solid content of 40.5%.

Composition 2 for surface modifying layer
(Examples 2, 3, 7, and 5)

| | |
|---|---|
| Colloidal silica slurry (MIBK dispersion liquid; solid content: 40%, average particle diameter: 20 nm) | 2.91 pts. mass |
| Polyfunctional urethane acrylate UV-1700B (ultraviolet curing resin; manufactured by Nippon Synthetic Chemical Industry Co., Ltd., MIBK solution, solid content: 60%,) | 6.10 pts. mass |
| Aronix M215 (ultraviolet curing resin; manufactured by TOAGOSEI CO., LTD., diacrylate of 2-mole ethylene oxide adduct of isocyanuric acid, MIBK solution, solid content: 60%) | 1.52 pts. mass |
| Photocuring initiator: | |
| Irgacure 184 (manufactured by Ciba Specialty Chemicals, K.K.) | 0.018 pt. mass |
| Irgacure 907 (manufactured by Ciba Specialty Chemicals, K.K.) | 0.003 pt. mass |
| Leveling agent: | |
| Silicone leveling agent | 0.0085 pt. mass |
| Solvent: | |
| Methyl isobutyl ketone (MIBK) | 2.06 pts. mass |
| Cyclohexanone | 0.41 pt. mass |

The above components were thoroughly mixed together, and the mixture was filtered through a polypropylene filter having a pore diameter of 30 μm to prepare composition 2 for a surface modifying layer, having a solid content of about 45%.

Composition 3 for surface modifying layer
(Comparative Example 5)

| | |
|---|---|
| Ultraviolet curing resin: | |
| Pentaerythritol triacrylate (PETA) (refractive index 1.51) | 20 pts. mass |
| Cellulose acetate propionate (molecular weight 50,000) | 0.28 pt. mass |
| Photocuring initiator: | |
| Irgacure 184 (manufactured by Ciba Specialty Chemicals, K.K.) | 1.01 pts. mass |
| Irgacure 907 (manufactured by Ciba Specialty Chemicals, K.K.) | 0.22 pt. mass |

-continued

Composition 3 for surface modifying layer
(Comparative Example 5)

Solvent:

| | |
|---|---|
| Toluene | 30 pts. mass |
| Cyclohexanone | 10 pts. mass |

The above components were thoroughly mixed together, and the mixture was filtered through a polypropylene filter having a pore diameter of 30 μm to prepare composition 3 for a surface modifying layer, having a solid content of about 45%.

Preparation of Composition for Low-Refractive Index Layer

| Composition 1 for low-refractive index layer (Examples 5, 8, and 9) | |
|---|---|
| Hollow silica slurry (IPA and MIBK dispersion liquid; solid content 20%, particle diameter 50 nm) | 9.57 pts. mass |
| Pentaerythritol triacrylate PET30 (ultraviolet curing resin; manufactured by Nippon Kayaku Co., Ltd.) | 0.981 pt. mass |
| AR110 (fluoropolymer; MIBK solution (solid content 15%), manufactured by Daikin Industries, Ltd.) | 6.53 pts. mass |
| Irgacure 127 (manufactured by Ciba Specialty Chemicals, K.K.) | 0.069 pt. mass |
| Leveling agent: | |
| Silicone leveling agent | 0.157 pt. mass |
| Solvent: | |
| Propylene glycol monomethyl ether (PGME) | 28.8 pts. mass |
| Methy isobutyl ketone | 53.9 pts. mass |

The above components were thoroughly mixed together, and the mixture was filtered through a polypropylene filter having a pore diameter of 10 μm to prepare composition 1 for a low-refractive index layer, having a solid content of 4%. The refractive index was 1.40.

Example 1

Formation of Anti-Dazzling Layer

An 80 μm-thick triacetylcellulose film (TD80U, manufactured by Fuji Photo Film Co., Ltd.) was provided as a transparent base material. Composition 1 for an anti-dazzling layer was coated onto the transparent base material with a wire-wound rod for coating (Mayer's bar) #6, and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form an anti-dazzling optical laminate. The total thickness of the anti-dazzling layer on the base material was about 2.7 μm.

Example 2

Formation of Substrate Concavoconvex Layer

An 80 μm-thick triacetate cellulose film (TD80U, manufactured by Fuji Photo Film Co., Ltd.) was provided as a transparent base material. Composition 4 for a substrate concavoconvex layer was coated onto the transparent base material with a wire-wound rod for coating (Mayer's bar) #14, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 2 for a surface modifying layer was further coated onto the substrate concavoconvex layer with a wire-wound rod for coating (Mayer's bar) #10, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an anti-dazzling optical laminate. The total thickness of the anti-dazzling layer on the base material was about 12 μm.

Example 3

Formation of Substrate Concavoconvex Layer

An 80 μm-thick triacetate cellulose film (TD80U, manufactured by Fuji Photo Film Co., Ltd.) was provided as a transparent base material. Composition 1 for a substrate concavoconvex layer was coated onto the transparent base material with a wire-wound rod for coating (Mayer's bar) #10, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 2 for a surface modifying layer was further coated onto the substrate concavoconvex layer with a wire-wound rod for coating (Mayer's bar) #12, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an anti-dazzling optical laminate. The total thickness of the anti-dazzling layer on the base material was about 9 μm.

Example 4

Formation of Anti-Dazzling Layer

An 80 μm-thick triacetylcellulose film (TD80U, manufactured by Fuji Photo Film Co., Ltd.) was provided as a transparent base material. Composition 2 for an anti-dazzling layer was coated onto the transparent base material with a wire-wound rod for coating (Mayer's bar) #6, and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form an anti-dazzling optical laminate. The total thickness of the anti-dazzling layer on the base material was about 3 μm.

Example 5

Formation of Substrate Concavoconvex Layer

An 80 μg/m-thick triacetate cellulose film (TD80U, manufactured by Fuji Photo Film Co., Ltd.) was provided as a transparent base material. Composition 3 for a substrate concavoconvex layer was coated onto the transparent base material with a wire-wound rod for coating (Mayer's bar) #14, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 2 for a surface modifying layer was further coated onto the substrate concavoconvex layer with a wire-wound rod for coating (Mayer's bar) #12, and the coating was heat dried in an oven of 70° C. for one min to evaporate the solvent component. Thereafter, ultraviolet light was applied at an exposure of 30 mJ to cure the coating film and thus to stack a surface modifying layer.

Formation of Low-Refractive Index Layer

Composition 1 for a low-refractive index layer was further coated onto the surface modifying layer with a wire-wound rod for coating (Mayer's bar) #2, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, low-refractive index layer was stacked to produce an anti-dazzling optical laminate. The total thickness of the anti-dazzling layer on the base material was about 13.6 μm.

Example 6

Formation of Substrate Concavoconvex Layer

A 100 μm-thick biaxially stretched polyethylene terephthalate film (manufactured by Toyobo Co., Ltd., tradename "A4300") was provided as a transparent base material. Composition 2 for a substrate concavoconvex layer was coated onto the transparent base material with a wire-wound rod for coating (Mayer's bar) #8, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 1 for a surface modifying layer was further coated onto the substrate concavoconvex layer with a wire-wound rod for coating (Mayer's bar) #10, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an anti-dazzling optical laminate. The total thickness of the anti-dazzling layer on the base material was about 12.5 μm.

Example 7

Formation of Substrate Concavoconvex Layer

An 80 μm-thick triacetate cellulose film (TD80U, manufactured by Fuji Photo Film Co., Ltd.) was provided as a transparent base material. Composition 3 for a substrate concavoconvex layer was coated onto the transparent base material with a wire-wound rod for coating (Mayer's bar) #14, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 2 for a surface modifying layer was further coated onto the substrate concavoconvex layer with a wire-wound rod for coating (Mayer's bar) #12, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an anti-dazzling optical laminate. The total thickness of the anti-dazzling layer on the base material was about 13.5 μm.

Example 8

Formation of Anti-Dazzling Layer

An 80 μm-thick triacetylcellulose film (TD80U, manufactured by Fuji Photo Film Co., Ltd.) was provided as a transparent base material. Composition 4 for an anti-dazzling layer was coated onto the transparent base material with a wire-wound rod for coating (Mayer's bar) #5, and the coated transparent base material was heat dried in an oven of 70° C. for one min to evaporate the solvent component. Thereafter, ultraviolet light was applied at an exposure of 30 mJ to cure the coating film and thus to stack an anti-dazzling layer.

Formation of Low-Refractive Index Layer

Composition 1 for a low-refractive index layer was further coated onto the anti-dazzling layer with a wire-wound rod for coating (Mayer's bar) #2, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, low-refractive index layer was stacked to produce an anti-dazzling optical laminate. The total thickness of the anti-dazzling layer on the base material was about 2.5 μm.

Example 9

Formation of Anti-Dazzling Layer

An 80 μm-thick triacetylcellulose film (TD80U, manufactured by Fuji Photo Film Co., Ltd.) was provided as a transparent base material. Composition 5 for an anti-dazzling layer was coated onto the transparent base material with a wire-wound rod for coating (Mayer's bar) #6, and the coated transparent base material was heat dried in an oven of 70° C. for one min to evaporate the solvent component. Thereafter, ultraviolet light was applied at an exposure of 30 mJ to cure the coating film and thus to stack an anti-dazzling layer.

Formation of Low-Refractive Index Layer

Composition 1 for a low-refractive index layer was further coated onto the anti-dazzling layer with a wire-wound rod for coating (Mayer's bar) #2, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, low-refractive index layer was stacked to produce an anti-dazzling optical laminate. The total thickness of the anti-dazzling layer on the base material was about 3 μm.

Example 10

Formation of Anti-Dazzling Layer

An 100 μm-thick polyethylene terephthalate film (A1543, manufactured by Toyobo Co., Ltd.) was provided as a transparent base material. Composition 6 for an anti-dazzling layer was coated onto the transparent base material with a wire-wound rod for coating (Mayer's bar) #6, and the coated transparent base material was heat dried in an oven of 70° C. for one min to evaporate the solvent component. Thereafter, ultraviolet light was applied at an exposure of 30 mJ to cure the coating film and thus to stack an anti-dazzling layer.

Formation of Low-Refractive Index Layer

Composition 1 for a low-refractive index layer was further coated onto the anti-dazzling layer with a wire-wound rod for coating (Mayer's bar) #2, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, low-refractive index layer was stacked to produce an anti-dazzling optical laminate. The total thickness of the anti-dazzling layer on the base material was about 3 μm.

Comparative Example 1

Formation of Substrate Concavoconvex Layer

An 80 μm-thick triacetate cellulose film (TD80U, manufactured by Fuji Photo Film Co., Ltd.) was provided as a transparent base material. Composition 5 for a substrate concavoconvex layer was coated onto the transparent base material with a wire-wound rod for coating (Mayer's bar) #14, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 2 for a surface modifying layer was further coated onto the substrate concavoconvex layer with a wire-wound rod for coating (Mayer's bar) #10, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an anti-dazzling optical laminate. The total thickness of the anti-dazzling layer on the base material was about 12 μm.

Comparative Example 2

Formation of Anti-Dazzling Layer

An 80 μm-thick triacetylcellulose film (TD80U, manufactured by Fuji Photo Film Co., Ltd.) was provided as a transparent base material. Composition 3 for an anti-dazzling layer was coated onto the transparent base material with a wire-wound rod for coating (Mayer's bar) #6, and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form an anti-dazzling optical laminate. The total thickness of the anti-dazzling layer on the base material was about 3 μm.

Comparative Example 3

Formation of Anti-Dazzling Layer

An 80 μm-thick triacetylcellulose film (TD80U, manufactured by Fuji Photo Film Co., Ltd.) was provided as a transparent base material. Composition 7 for an anti-dazzling layer was coated onto the transparent base material with a wire-wound rod for coating (Mayer's bar) #8, and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form an anti-dazzling optical laminate. The total thickness of the anti-dazzling layer on the base material was about 4.2 μm.

Comparative Example 4

Formation of Anti-Dazzling Layer

An 80 μm-thick triacetylcellulose film (TD80U, manufactured by Fuji Photo Film Co., Ltd.) was provided as a transparent base material. Composition 8 for an anti-dazzling layer was coated onto the transparent base material with a wire-wound rod for coating (Mayer's bar) #6, and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form an anti-dazzling optical laminate. The total thickness of the anti-dazzling layer on the base material was about 3.6 μm.

Comparative Example 5

Formation of Substrate Concavoconvex Layer

An 80 μm-thick triacetate cellulose film (TD80U, manufactured by Fuji Photo Film Co., Ltd.) was provided as a transparent base material. Composition 5 for a substrate concavoconvex layer was coated onto the transparent base material with a wire-wound rod for coating (Mayer's bar) #6, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 2 for a surface modifying layer was further coated onto the substrate concavoconvex layer with a wire-wound rod for coating (Mayer's bar) #8, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an optical laminate. The total thickness of the anti-dazzling layer on the base, material was about 8 μm.

Comparative Example 6

Formation of Substrate Concavoconvex Layer

An 80 μm-thick triacetate cellulose film (TD80U, manufactured by Fuji Photo Film Co., Ltd.) was provided as a transparent base material. Composition 7 for a substrate concavoconvex layer was coated onto the transparent base material with a wire-wound rod for coating (Mayer's bar) #14, and the coated transparent base material was heat dried in an oven of 70° C. for one min to evaporate the solvent component. Thereafter, ultraviolet light was applied at an exposure of 30 mJ to cure the coating film and thus to form a substrate concavoconvex layer.

Formation of Surface Modifying Layer

Composition 1 for a surface modifying layer was further coated onto the substrate concavoconvex layer with a wire-wound rod for coating (Mayer's bar) #10, and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to stack a surface modifying layer to produce an anti-dazzling optical laminate. The total thickness of the anti-dazzling layer on the base material was about 12 μm.

Evaluation Test

The following evaluation tests were carried out. The results are shown in following Table 1.

Evaluation 1: Optical Property Test and Surface Shape

For the optical laminates of Examples and Comparative Examples, the whole haze Ha value of the optical laminate, the internal haze value Hi of the optical laminate, Hi/Ha value, Sm, θa, Rz, and Ra were measured according to the definition described in the present specification.

Evaluation 2: Anti-Dazzling Property Evaluation Test

The backside of an optical laminate produced in the Examples and Comparative Examples was subjected to treatment for rendering the backside self-adhesive, and each of the treated optical laminates were applied to the black acrylic plate to prepare evaluation samples. A 20 mm-width black-and-white stripe plate was provided. An image of this stripe was caught in the sample (the sample face was inclined upward at an angle of about 30 degrees) at an angle of 20 degrees from a normal to the sample face, and the sample was observed. The illuminance of the sample face was 250 lx (luxes), and the brightness (white) of the stripe was 65 cd/m$^2$. The distance between the stripe plate and the sample was brought to 1.5 m, and the distance between the sample and the viewer was 1 m. The anti-dazzling property was defined and evaluated in relationship with the perception of the stripe by an observer as follows.

Evaluation Criteria
⊚: Stripes could not be perceived at all.
○: Stripes could be slightly perceived but are not significant.
x: Stripes could be perceived.

Evaluation 3: Black Color Reproduction Test (Light Room Environment)

A crossed Nicol polarizing plate was applied onto each of the optical laminates of Example and Comparative Example on its side remote from the film face. Sensory evaluation was carried out under three-wavelength fluorescence of 30 W (applied to the anti-dazzling layer face in a 45-degree direction), and black color reproduction (whether the sample is seen as a jet-black color) was evaluated in detail according to the following criteria. The sensory evaluation was carried out by visual observation from 50 cm above the sample surface at an angle of about 45 degrees. In this case, a crossed Nicol polarizing plate was used as a black reference sample for black color comparison.

Evaluation Criteria
⊚: Black color could be reproduced.
○: Black color could be substantially reproduced although the reproduced black color had a milky white impression which was slight and not significant.
x: Black color could not be reproduced, and the reproduced color had a milky white impression.

Evaluation 4: Glare Evaluation Test

A black matrix pattern plate (75 ppi, 100 ppi) formed on a 0.7 mm-thick glass was placed on a viewer manufactured by HAKUBA (light viewer 7000PRO) so that the pattern surface faced downward. The optical laminate film prepared above was placed thereon so that the concavoconvex face was on the air side. Glare was visually observed in a dark room while lightly pressing with a finger the edge of the film to prevent the lift of the film, and the results were evaluated.

Evaluation Criteria
⊚: Glare could not be perceived at 100 ppi.
○: Glare could not be perceived at 75 ppi although glare was perceived at 100 ppi.
x: Glare was perceived at 75 ppi.

TABLE 1

| | Evaluation 1 | | | | | | | | Evaluation 2 | Evaluation 3 | |
| --- | --- | --- | --- | --- | --- | --- | --- | --- | --- | --- | --- |
| | Whole haze | Internal haze | Surface haze | Haze ratio | Sm, μm | Rz, μm | θa, ° | Ra, μm | Anti-dazzling property | Black color reproduction | Evaluation 4 Glare |
| Ex. 1 | 3.5 | 0.1 | 3.4 | 0.029 | 77 | 1.99 | 1.46 | 0.22 | ⊚ | ○ | ○ |
| Ex. 2 | 7 | 5.4 | 1.6 | 0.771 | 109 | 0.47 | 0.43 | 0.15 | ⊚ | ○ | ⊚ |
| Ex. 3 | 0.5 | 0.1 | 0.4 | 0.200 | 136 | 0.51 | 0.41 | 0.11 | ○ | ⊚ | ○ |
| Ex. 4 | 7.6 | 0.1 | 7.5 | 0.013 | 63 | 4.61 | 3.10 | 0.31 | ○ | ○ | ○ |
| Ex. 5 | 3.7 | 2.5 | 1.2 | 0.676 | 189 | 0.66 | 0.45 | 0.12 | ⊚ | ○ | ⊚ |
| Ex. 6 | 1.6 | 0.2 | 1.4 | 0.125 | 144 | 0.41 | 0.30 | 0.13 | ⊚ | ○ | ○ |
| Ex. 7 | 5.2 | 3.8 | 1.4 | 0.73 | 172 | 0.85 | 0.77 | 0.12 | ⊚ | ○ | ○ |
| Ex. 8 | 2.2 | 0.6 | 1.5 | 0.364 | 423 | 1.29 | 0.69 | 0.23 | ○ | ○ | ○ |
| Ex. 9 | 2 | 0.8 | 1.2 | 0.450 | 334 | 0.90 | 0.66 | 0.20 | ○ | ○ | ○ |
| Ex. 10 | 1.8 | 0.6 | 1.2 | 0.333 | 272 | 0.97 | 0.56 | 0.19 | ○ | ○ | ○ |
| Comp. Ex. 1 | 8.7 | 7 | 1.7 | 0.805 | 110 | 0.43 | 0.40 | 0.14 | ⊚ | x | ⊚ |
| Comp. Ex. 2 | 12 | 0.1 | 11.9 | 0.008 | 59 | 2.05 | 2.09 | 0.26 | ○ | x | ○ |
| Comp. Ex. 3 | 10 | 2 | 8 | 0.2 | 61 | 3.9 | 2.6 | 0.28 | ○ | x | ⊚ |
| Comp. Ex. 4 | 11 | 7.2 | 3.9 | 0.6486 | 65 | 0.8 | 0.8 | 0.14 | ○ | x | ⊚ |
| Comp. Ex. 5 | 7 | 7 | 0 | 1 | 20 | 0.09 | 0.01 | 0.03 | x | ⊚ | ⊚ |
| Comp. Ex. 6 | 1.8 | 1.5 | 0.3 | 0.8333 | 122 | 0.48 | 0.38 | 0.14 | ○ | ○ | x |

The invention claimed is:
1. An optical laminate comprising:
a light transparent base material; and
an anti-dazzling layer provided on the light transparent base material, said anti-dazzling layer comprising a substrate concavoconvex layer and a surface modifying layer formed thereon, wherein an outermost surface of the anti-dazzling layer has a concavoconvex shape;

wherein the optical laminate satisfies the following requirements:

Ha is more than 0% and less than 8%,
Hi is more than 0% and not more than 6%,
Hi/Ha is not less than 0.013 and less than 0.8,
Sm is not less than 100 μm and not more than 450 μm,
θa is not less than 0.3 degrees and not more than 0.8 degrees,
Rz is not less than 0.4 μm and not more than 1.6 μm, and
Ra is not less than 0.1 μm and not more than 0.25 μm,
wherein Ha represents a whole haze value of the optical laminate, Hi represents an internal haze value of the optical laminate, Sm represents an average spacing of profile irregularities of the anti-dazzling layer, θa represents an average inclination angle of the concavoconvex portion of the anti-dazzling layer, Rz represents a 10-point average roughness and Ra represents an arithmetical roughness; and
wherein measurements of Sm, θa, Rz and Ra are carried out under measuring conditions for a surface roughness measuring device comprising a reference length, which is a cut-off value of roughness curve λc, of 0.8 mm, an evaluation length, which is the reference length cut-off value λc×5, of 4.0 mm, and a tracer feed speed of 0.1 mm/sec.

2. The optical laminate according to claim 1, which has an Hs value of not less than 0.1% and not more than 7.5% wherein Hs represents the surface haze of the optical laminate.

3. The optical laminate according to claim 1, wherein the anti-dazzling layer comprises a resin and fine particles.

4. The optical laminate according to claim 3, wherein the difference n in refractive index between the resin and the fine particles is more than 0 and not more than 0.2.

5. The optical laminate according to claim 4, wherein the lower limit value of the difference n in refractive index between the resin and the fine particles is not less than 0.03.

6. The optical laminate according to claim 3, wherein the difference n in refractive index between the resin and the fine particles is more than 0 and less than 0.03.

7. The optical laminate according to claim 3, wherein the fine particles are inorganic fine particles or organic fine particles.

8. The optical laminate according to claim 3, wherein the fine particles are aggregation-type fine particles.

9. The optical laminate according to claim 3, wherein the fine particles have an average particle diameter R of not less than 1.0 μm and not more than 20 μm.

10. The optical laminate according to claim 3, wherein the fine particles are of two or more types.

11. The optical laminate according to claim 3, wherein the resin comprises an ionizing radiation curing resin and a solvent drying-type resin.

12. The optical laminate according to claim 1, wherein the surface modifying layer comprises one material or a mixture of two or more materials selected from the group consisting of electroconductive agents, refractive index regulators, contamination inhibitors, water repellents, oil repellents, fingerprint adhesion preventive agents, highly curing agents, and hardness regulators.

13. The optical laminate according to claim 1, wherein the anti-dazzling layer further has on its surface a low-refractive index layer having a lower refractive index than the refractive index of the anti-dazzling layer, and
when the anti-dazzling layer comprises a surface modifying layer provided on a surface of a substrate concavoconvex layer, and the refractive index of the low-refractive index layer is lower than the refractive index of the surface modifying layer.

14. The optical laminate according to claim 1, for use in a spontaneous luminescent image display device or nonspontaneous luminescent image display device on its image display-side surface.

15. The optical laminate according to claim 14, wherein the spontaneous luminescent image display device is a cathode-ray tube display device (CRT), a plasma display (PDP), an electroluminescent display (ELD), or a field emission display (FED), and the nonspontaneous luminescent image display device is a liquid crystal display (LCD).

16. A polarizing plate comprising a polarizing element, wherein the polarizing element has an optical laminate according to claim 1 provided on the surface of the polarizing element, the optical laminate being provided so that the surface of the optical laminate remote from the anti-dazzling layer faces the surface of the polarizing element.

17. An image display device comprising: a transmission display; and a light source device for applying light to the transmission display from its backside, wherein
an optical laminate according to claim 1 is provided on the surface of the transmission display.

18. An image display device comprising: a transmission display; and a light source device for applying light to the transmission display from its backside, wherein
a polarizing plate according to claim 14 is provided on the surface of the transmission display.

19. The optical laminate according to claim 1, wherein the surface modifying layer comprises colloidal silica.

20. The optical laminate according to claim 1, wherein the anti-dazzling layer comprises a resin, first fine particles, and second fine particles; and
wherein a total weight ratio per unit area of the resin, the first fine particles, and the second fine particles satisfies requirements represented by the following formula:

$$0.08 \leq (M_1 \times M_2)/M \leq 0.38$$

$$0 \leq M_2 \leq 4.0 M_1$$

wherein $M_1$ represents a total weight of the first fine particles per unit area; $M_2$ represents a total weight of the second fine particles per unit area; and M represents a total weight of the resin per unit area.

* * * * *